United States Patent
Bock et al.

(10) Patent No.: US 12,247,088 B2
(45) Date of Patent: Mar. 11, 2025

(54) METHOD OF PREPARING A HEAT-MODIFIED STARCH

(71) Applicant: ROQUETTE FRERES, Lestrem (FR)

(72) Inventors: Solène Bock, Lambersart (FR); Vincent Wiatz, Premesques (FR); Claude Quettier, Lambersart (FR)

(73) Assignee: Roquette Freres, Lestrem (FR)

(*) Notice: Subject to any disclaimer, the term of this patent is extended or adjusted under 35 U.S.C. 154(b) by 692 days.

(21) Appl. No.: 16/770,431

(22) PCT Filed: Dec. 20, 2018

(86) PCT No.: PCT/FR2018/053456
§ 371 (c)(1),
(2) Date: Jun. 5, 2020

(87) PCT Pub. No.: WO2019/122749
PCT Pub. Date: Jun. 27, 2019

(65) Prior Publication Data
US 2020/0308311 A1    Oct. 1, 2020

(30) Foreign Application Priority Data

Dec. 20, 2017 (FR) .................................... 1762645
Feb. 26, 2018 (FR) .................................... 1851658
(Continued)

(51) Int. Cl.
*C08B 30/12* (2006.01)
*A23C 9/137* (2006.01)
(Continued)

(52) U.S. Cl.
CPC .............. *C08B 30/12* (2013.01); *A23C 9/137* (2013.01); *A23L 27/63* (2016.08); *A23L 29/212* (2016.08); *A23V 2002/00* (2013.01)

(58) Field of Classification Search
None
See application file for complete search history.

(56) References Cited

U.S. PATENT DOCUMENTS 5,846,786 A    12/1998  Senkeleski et al.
6,221,420 B1    4/2001  Thomas et al.
(Continued)

FOREIGN PATENT DOCUMENTS

| CN | 107383219 A | 11/2017 | |
|---|---|---|---|
| WO | WO-9640793 A1 * | 12/1996 | ............. A23L 1/005 |
| WO | 2014042537 A1 | 3/2014 | |

OTHER PUBLICATIONS

Essers: published as WO 2014/042537 A1 on Mar. 20, 2014. (Year: 2014).*

(Continued)

*Primary Examiner* — Patricia A George

(57) ABSTRACT

The invention relates to a method of producing a heat-modified starch comprising the steps of: (i) preparing a starch milk containing between 30 and 40% by weight, preferably between 35 and 37% by weight, solid matter, (ii) adding a powdery alkaline agent such as to obtain a final conductivity of between 0.7 and 2.5 mS/cm, (iii) ensuring a contact time of between 0.5 and 5 hours, (iv) filtering and drying the starch milk, (v) and heating the dried starch to bring it to a temperature of more than 180° C. for a dwell time of between 8 and 50 minutes, preferably between 10 and 40 minutes, even more preferably between 12 and 35 minutes.

14 Claims, 4 Drawing Sheets

(30) Foreign Application Priority Data

Apr. 19, 2018 (FR) .................................... 1853466
Nov. 30, 2018 (FR) .................................... 1872125

(51) Int. Cl.
*A23L 27/60* (2016.01)
*A23L 29/212* (2016.01)

(56) References Cited

U.S. PATENT DOCUMENTS

2001/0017133 A1  8/2001  Chiu et al.
2011/0129579 A1  6/2011  Park et al.

OTHER PUBLICATIONS

Chiu: published as WO 1996/040793 on Dec. 19, 1996. (Year: 1996).*
The English translation of the International Search Report, mailed on May 10, 2019, in the corresponding PCT Appl. No. PCT/FR2018/053456.
European Pharmacopoeia-Conductivity (§ 2.2.38), Jul. 2010. (2 pages).
The English translation of the Chinese Office Action, mailed on Sep. 15, 2021, in the related Chinese Appl. No. 201880082591.8.
Zhang, "Effect of Heat Treatment on Structure and Properties of highland barley starch," China Excellent Master's Degree Thesis Full-text Database Engineering Science and Technology Series 1, Feb. 15, 2017. (English abstract Included.).
Ru Yuan, "Effect of Heat Treatment on Structure and Properties of Corn Starch," China Excellent Master's Degree Thesis Full-text Database Engineering Science and Technology Series 1, Apr. 15, 2016. (English abstract included.).
Ru Yuan et al., "Effect of dry heating on properties of corn starch," Science and Technology of Food Industry, vol. 36, No. 16, pp. 138-141, Dec. 31, 2015. (English abstract included.).
Gonza'lez et al., "Amaranth starch-rich fraction properties modified by extrusion and fluidized bed heating," LWT-Food Science and technology, vol. 40, No. 1, pp. 136-143, Dec. 31, 2007.
Chen et al., "Effects of Different Heat Treatments on the Physicochemical Properties of Plantain Resistant Starch," Modern Food Science and Technology, vol. 28, Issue 1, pp. 9-13 and 51, Dec. 31, 2012. (English abstract Included.).
Song et al., "Research Progress in the Effect of Thermal Treatments on the Structural and Physicochemical Properties of Starch," Dark Oil Chapin Cot, vol. 29, No. 3, pp. 111-117, Apr. 16, 2021.

* cited by examiner

[Fig. 1]
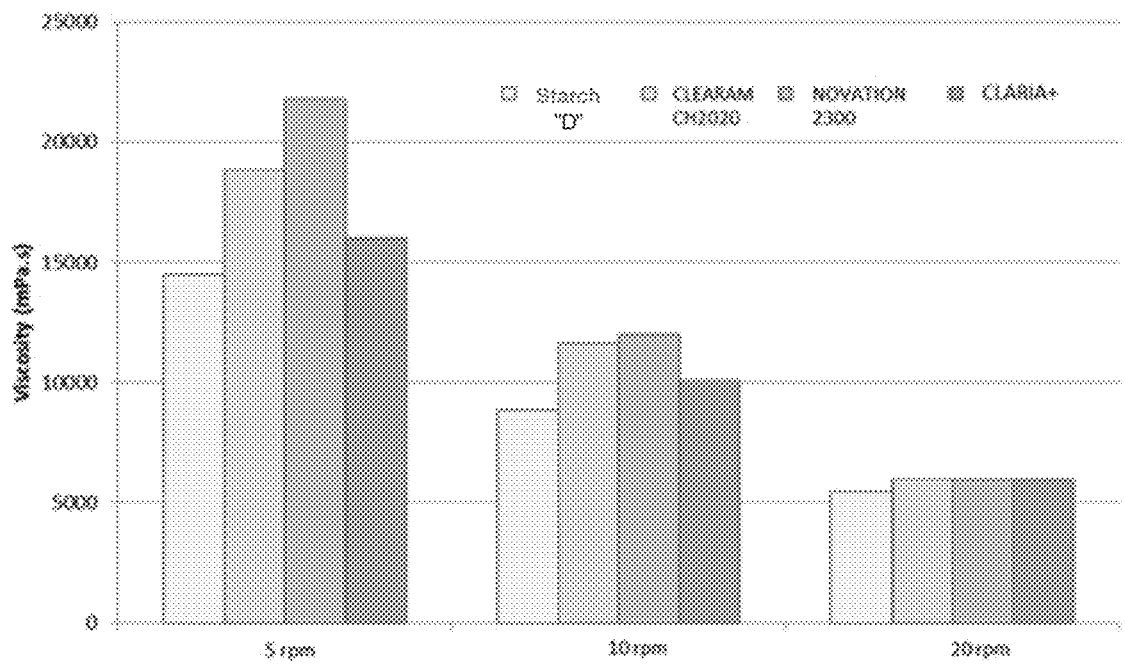
[Fig. 2]
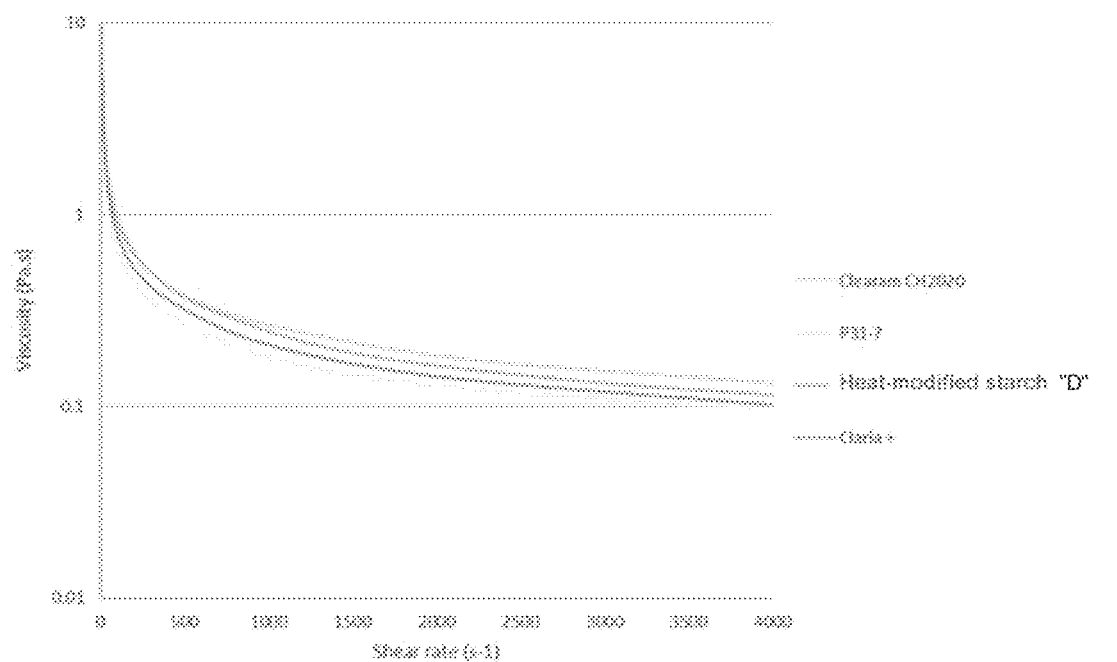

[Fig. 3]
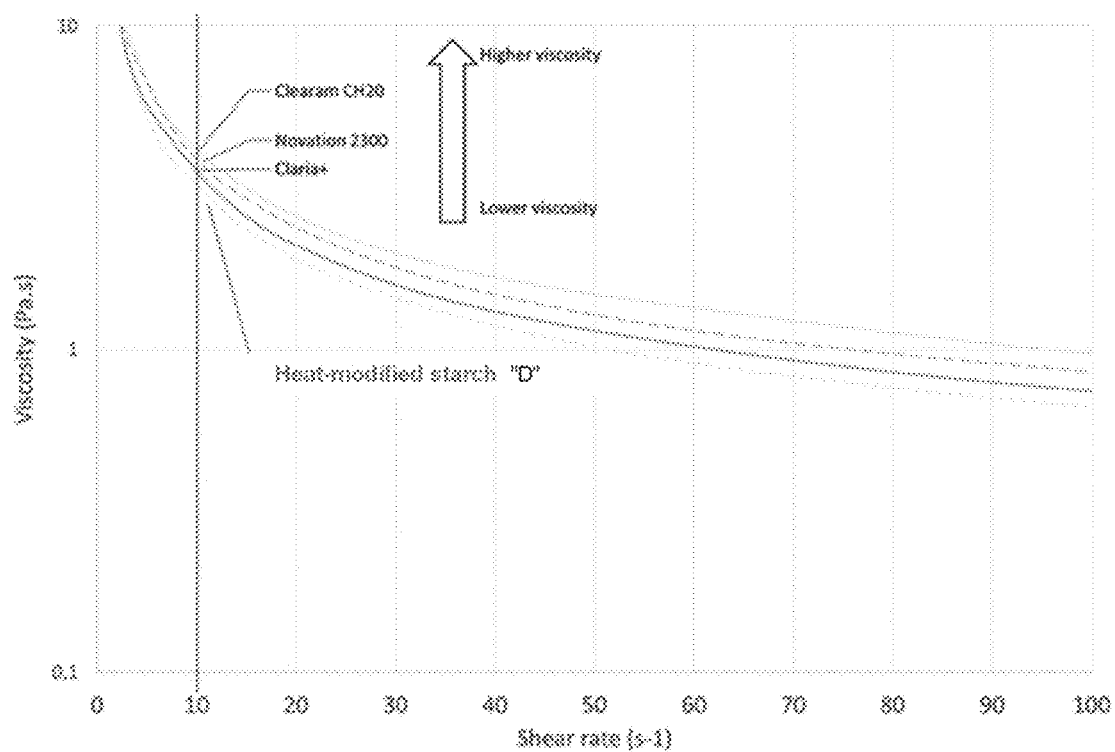
[Fig. 4]
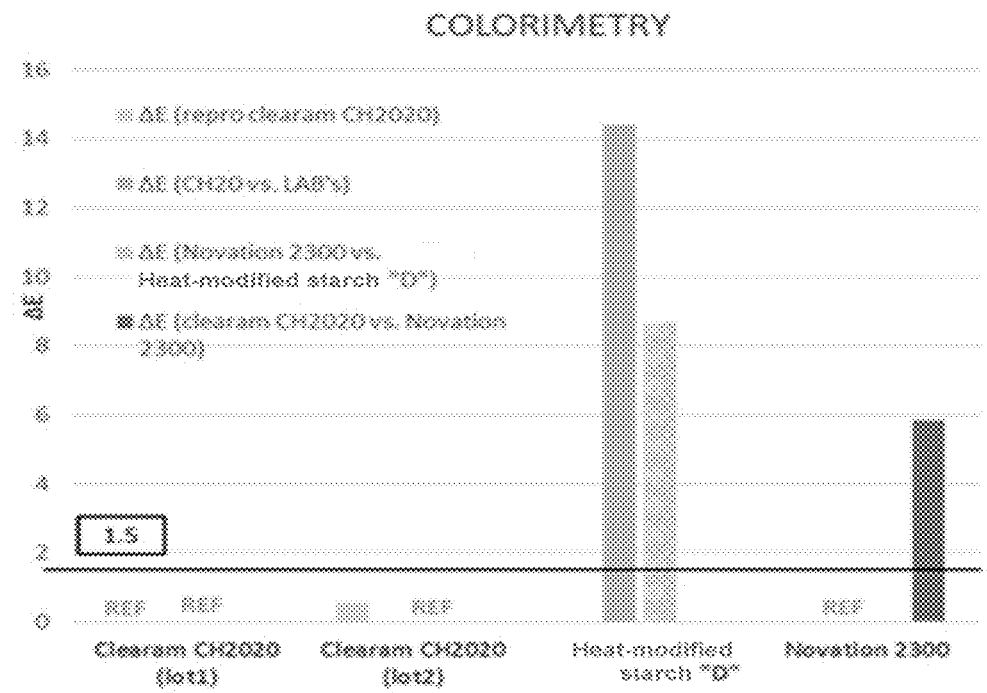

[Fig. 5]
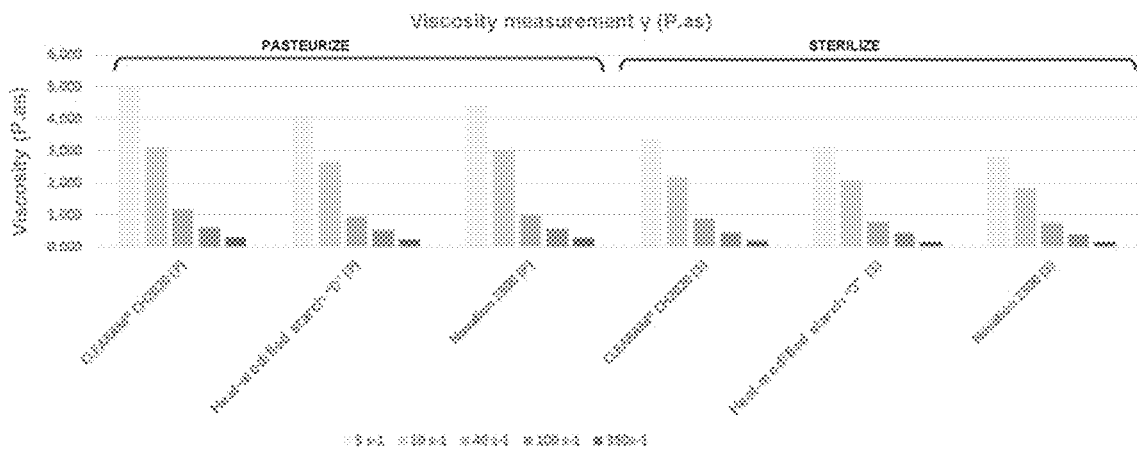
[Fig. 6]
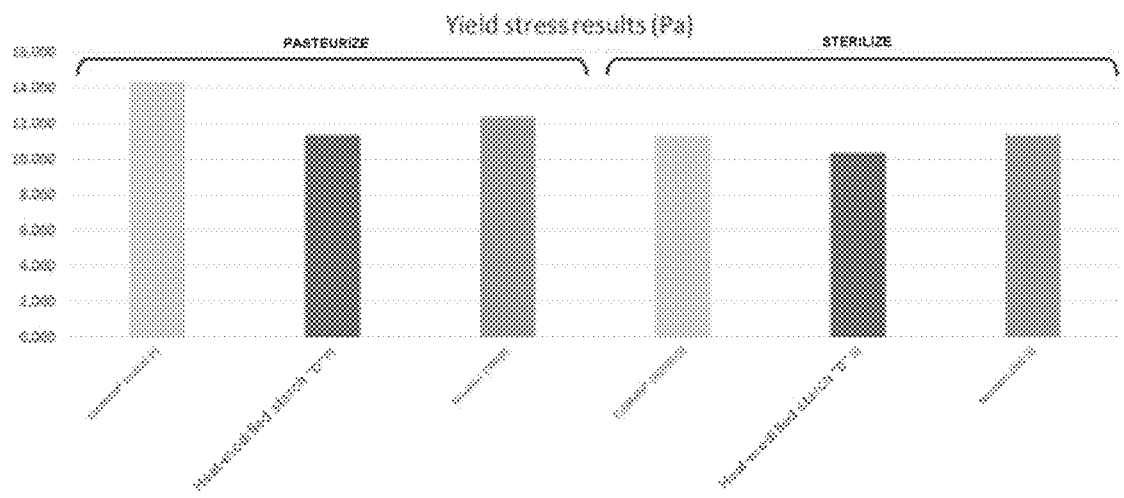
[Fig. 7]
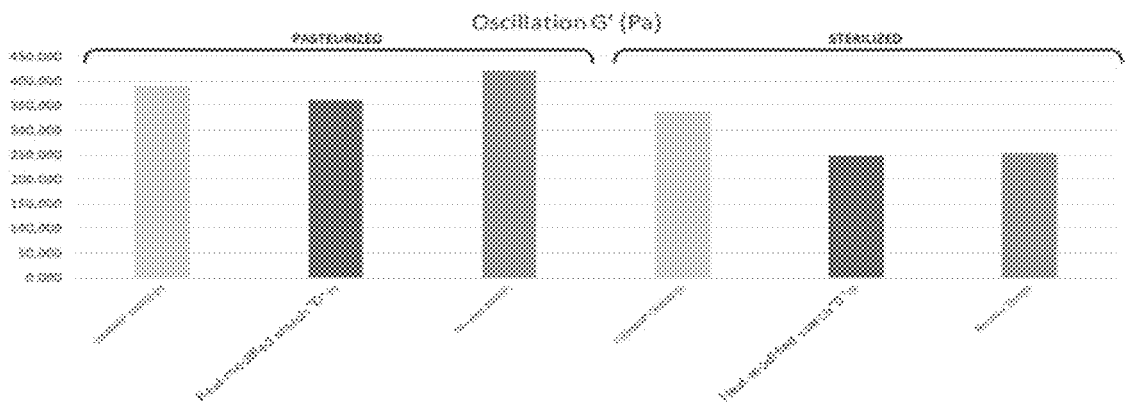

[Fig. 8]
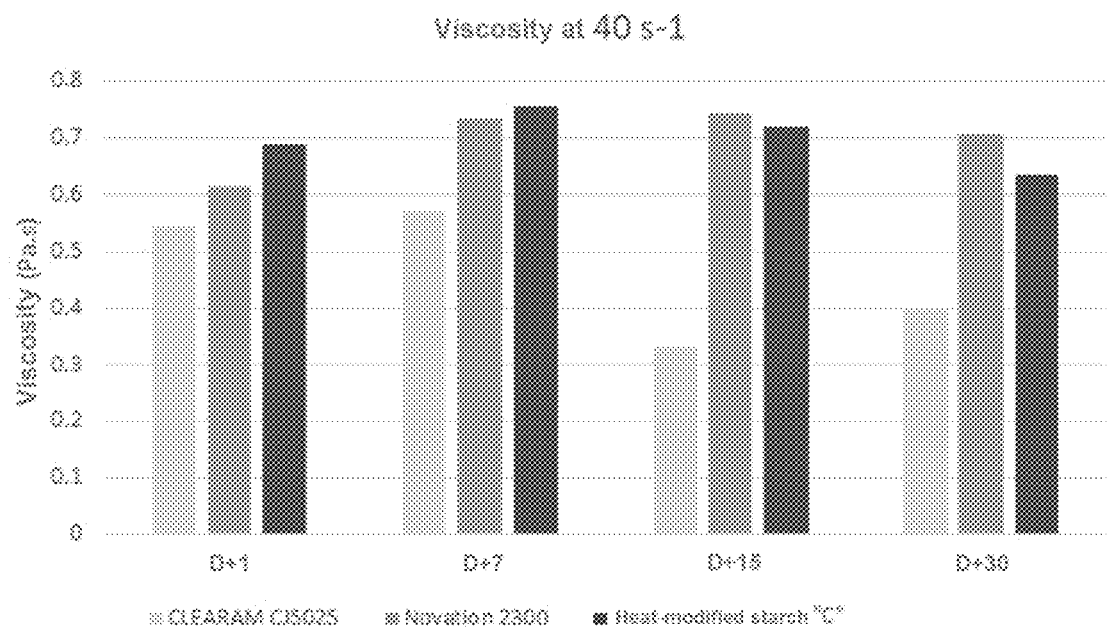
[Fig. 9]
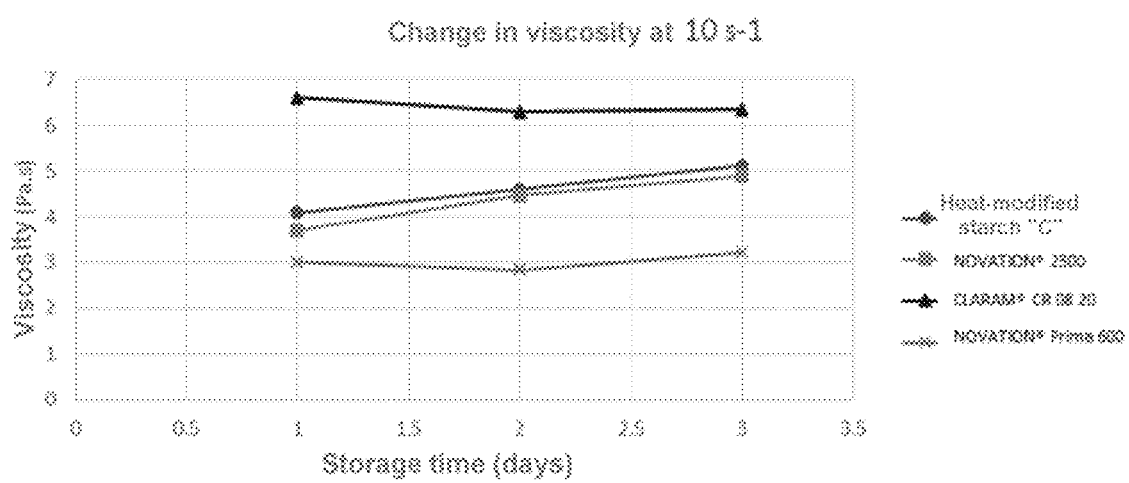

METHOD OF PREPARING A HEAT-MODIFIED STARCH

This application is a National Stage Application of PCT/FR2018/053456 filed Dec. 20, 2018, which claims priority from French Patent Application Nos. 17 62645 filed on Dec. 20, 2017, 18 51658 filed on Feb. 26, 2018, 18 53466 filed on Apr. 19, 2018 and 18 72125 filed on Nov. 30, 2018. The priority of said PCT and French Patent Applications are claimed. Each of the prior mentioned applications is hereby incorporated by reference herein in its entirety.

The invention relates to the production of heat-modified starch, and to the starch whose viscosity is stabilized following this heat treatment. Such heat-modified starches then find use as texturing agents and thickeners in numerous food applications, notably in soups and sauces, in desserts such as yogurts, stirred fermented milks, thermized yogurts and dessert creams, but also drinks, ready meals, or meat- or fish-based preparations, such as surimi.

CONTEXT OF THE INVENTION

Synthesized biochemically, starch, which is a source of carbohydrates, is one of the most widespread organic materials of the plant world, where it constitutes the nutritional store of organisms.

For a long time, starches have been used in the food industry, not only as a nutritive ingredient, but also for their technological properties, as thickener, binder, stabilizer or gelling agent.

For example, native starches are used in preparations which require cooking. Corn starch, in particular, is the basis of "flan powders".

As it is rich in amylose, it retrogrades and thus gels strongly. It allows the production of set flans after cooking and cooling.

It is also suitable for custard cream mixes.

However, said starches cannot be included in pastries intended to be frozen, since, on thawing, the phenomenon of syneresis, which is reflected by an expulsion of water, destroys the texture of the cream.

Thus, in native form, starch is of limited application on account of the syneresis, but also on account of:
  its low resistance to shear stresses and to heat treatments,
  its poor processability and
  its low solubility in common organic solvents.

As a result, to meet the current demanding technological needs, the properties of starch must be optimized via various methods known as "modification".

These main modifications are then directed toward adapting starch to the technological constraints resulting from cooking, but also from freezing/thawing, canning or sterilization, and toward making it compatible with modern nutrition (microwaves, ready meals, "high temperatures", etc.).

The modification of starch is then directed toward correcting one or more of the defects mentioned above, thus improving its versatility and satisfying consumer demand.

Starch modification techniques have been globally classified into four categories: physical, chemical, enzymatic and genetic, the final purpose being to produce various derivatives with optimized physicochemical properties.

Chemical and physical modifications are the ones most often performed.

Chemical treatment consists in introducing functional groups into starch, which considerably alters its physicochemical properties. Such modifications of granular native starches indeed have a profound effect on the gelatinization, bonding and retrogradation behavior.

Generally, these modifications are achieved by chemical derivatization, such as esterification, etherification, crosslinking or grafting.

However, chemical modifications are less desired by consumers in food applications (also for environmental reasons), even though certain modifications are considered as safe.

Various physical modifications are consequently proposed, for example:
  heat moisture treatment (HMT), which consists in treating starch with controlled moisture levels (22-27%) and at high temperature, for 16 hours, in order to alter the structure and the physicochemical properties of the starch;
  annealing, which consists in treating starch in excess water at temperatures below the gelatinization temperature, in order to approach the glass transition temperature;
  high-pressure processing (HPP), via which the amorphous regions of the starch granule are hydrated, which leads to distortion of the crystalline parts of the granule and promotes the accessibility to water of said crystalline regions;
  glow discharge plasma treatment, which generates, at ambient temperature, high-energy electrons and other highly reactive species. When applied to starch, these active species excite the chemical groups of the starch and bring about substantial crosslinking of the macromolecules;
  osmotic pressure treatment (OPT), performed in the presence of solutions with a high content of salts. Starch is suspended in sodium sulfate so as to produce a uniform suspension.
  The starch passes from type B to type A after treatment, thus acquiring a gelatinization temperature which increases significantly;
  treatment by "thermal inhibition". In general terms, thermal inhibition means the dehydration of a starch until it reaches the anhydrous or substantially anhydrous state (i.e. <1% moisture), followed by a heat treatment at more than 100° C. for a period of time that is sufficient to "inhibit" the starch, in the present instance to give it crosslinked starch properties. It is moreover necessary to place the starch under at least neutral to preferentially alkaline pH conditions before performing the step of rigorous dehydration.

An alternative form of "thermal inhibition" treatment was proposed in solvent phase, which consists in heating a non-pregelatinized granular starch in alcoholic medium, in the presence of a base and salts, at a temperature of 120° C. to 200° C., for 5 minutes to 2 hours.

In any case, the thermal inhibition process then leads to the production of a starch paste which has increased viscosity breaking resistance properties, and a noncohesive texture.

The technical field to which the invention applies is that of the thermal inhibition treatment of starch, without aqueous-alcoholic solvent.

In this particular technical field, mention may be made more particularly of U.S. 6,221,420, which describes a thermally inhibited starch, obtained by dehydration followed by heat treatment.

The main steps are:
dehydration of the starch to a water content of less than 1% performed at a temperature of between 100 and 125° C., and then
heat treatment of the dry starch thus obtained, at about 140° C., in a fluidized reaction bed, fora time of the order of 20 hours.

Preferentially, before the starch dehydration step, it is recommended to perform a step of basification of the starch, bringing the pH of the starch suspension to a value of between 7 and 10, preferably between 8 and 10.

At this stage, before the actual dehydration step which precedes the inhibition step, the water content of the starch (as illustrated) is then between 8% and 10%.

US 2001/0017133 describes a similar process, in which starch is also dehydrated below 125° C. before commencing the inhibition process (at a temperature above 100° C., preferentially between 120 and 180° C., more preferentially between 140 and 160° C.) fora time of up to 20 hours, preferentially between 3 hours 30 minutes and 4 hours 30 minutes.

Before the dehydration step, the conventional basification step leads to a starch suspension with a pH value of between 7.5 and 11.2, preferably between 8 and 9.5, and a water content of between 2% and 15%.

One variant was proposed in patent application WO 2014/042537, this variant relating to heating of an alkaline starch to temperatures of between 140 and 190° C., taking care to ensure that the inhibition process is started and conducted in the presence of a sufficient amount of water, i.e. more than 1% of water.

In other words, this process recommends thermally inhibiting a pre-basified starch without performing a dehydration step.

The starch preparation or the starch is thus brought to a pH of between 9.1 and 11.2, preferentially to a value of about 10, and the moisture is adjusted to between 2% and 22%, preferentially between 5% and 10%.

The thermal inhibition is then performed directly on this powder or this starch, at a temperature of between 140 and 190° C., preferentially between 140 and 180° C., for a time of 30 minutes.

From all of the foregoing, it is observed that the thermal inhibition processes used for stabilizing the viscosity of starches involve processes requiring
the use of long treatment times, i.e. up to 20 hours, and
the control of the water content of the starches to be treated, as a function of the processes proposed in the prior art, whether to values of less than 1% or, on the other hand, between 2% and 22%.

The need thus remains for a novel process for the inhibition of starch, making it possible to further reduce the reaction time, and without it being necessary to control the water content of the starch to be "thermally inhibited".

DESCRIPTION OF THE INVENTION

Thus, the invention relates to a process for producing a heat-modified starch from a starch milk, comprising the steps consisting in:
(i) preparing a starch milk with a solids content of between 30% and 40%, preferably between 35% and 37% by weight,
(ii) adding a powdered alkaline agent so as to obtain a final conductivity of between 0.7 and 2.5 mS/cm,
(iii) ensuring a contact time of between 0.5 and 5 hours,
(iv) filtering and drying the starch milk,
(v) heating said dried starch so as to bring it to a temperature above 180° C. for a residence time of between 8 and 50 minutes, preferably between 10 and 40 minutes, even more preferentially between 12 and 35 minutes.

The starch to be used in the process of the invention may be of any origin, for example corn, waxy corn, amylomaize, wheat, waxy wheat, pea, potato, waxy potato, tapioca, waxy tapioca, rice, konjac, etc.

Preferentially, corn starch will be chosen, more particularly waxy corn starch (with a high content of amylopectin), potato starch, cassava starch and pea starch, as will be illustrated hereinbelow.

The alkaline agent is preferentially chosen from the group consisting of sodium hydroxide, sodium carbonate, tetrasodium pyrophosphate, ammonium orthophosphate, disodium orthophosphate, trisodium phosphate, calcium carbonate, calcium hydroxide, potassium carbonate and potassium hydroxide, taken alone or in combination, even more preferentially sodium carbonate.

The process in accordance with the invention first requires the preparation of a starch milk with a solids content of between 30% and 40%, preferably between 35% and 37% by weight. As will be illustrated hereinbelow, the solids content is set at 36.5% by weight.

The next step then consists in controlling the alkaline impregnation of the starch by adding the alkaline agent in powder form to obtain a final conductivity, on the powder resuspended to a solids content of 20%, of between 0.7 and 2.5 mS/cm.

A contact time of between 0.5 and 5 hours is then ensured.
Specifically, the Applicant Company has found that:
the addition of the alkaline agent, more particularly the sodium carbonate, directly into the milk phase makes it possible more efficiently to reach the desired high pH values (between 10.2 and 10.8, preferably between 10.5 and 10.65) than by spraying sodium carbonate onto the starch as a dry phase, in the sense that the addition into the milk phase allows better migration of the carbonate into the starch granules when compared with an impregnation as powder.

Moreover, since impregnation in a powder phase requires adjustment of the moisture of the starch to high values, part of the energy dedicated to the treatment of the product will thus be lost to ensure the evaporation of the residual water.
controlling the level of impregnation of the starch via conductivity measurements makes it possible to achieve the required precision for said high pH values.

The final step consists in heating the dry starch thus obtained so as to bring it to a temperature above 180° C. for a residence time of between 8 and 50 minutes, preferably between 10 and 40 minutes, even more preferentially between 12 and 35 minutes.

The Applicant Company has noted that the duration of the residence time could be adjusted as a function of the nature of the chosen starch.

Thus, as will notably be illustrated hereinbelow, the treatment of waxy corn starch requires residence times of from 15 minutes to 20 minutes, or up to 30 or even 35 minutes, whereas the treatment of pea starch takes only 10 to 25 minutes.

This treatment will advantageously be performed, as will be illustrated hereinbelow, in heat treatment devices combining heat exchanges by conduction and by convection, a device of turbo dryer type, for example at least one VOMM continuous turbo dryer, which thus makes it possible, as a function of the size of said VOMM machine, to achieve a very short reaction time, of the order of a few minutes, i.e. less than 5 minutes per heat treatment stage.

The nominal temperatures are then set at values of more than 190° C., preferably between 195 and 240° C., and the delta T, defined as the difference in temperature between the nominal temperature and the temperature of the product leaving the reactor, is between 15 and 25° C.

The heat-modified starches according to the invention will advantageously be used, as a function of their respective properties, as thickener or texturing agent in food applications, notably in soups, sauces, drinks and ready meals and in desserts such as yogurts and stirred fermented milks and "thermized" yogurts.

By virtue of their texturing and gelling properties, they will also find numerous applications in fields as varied as:
  acidic soups and sauces (pasteurized and sterilized),
  pasta sauces with meat juice,
  desserts such as yogurts, stirred fermented milks, "thermized" yogurts and dessert creams,
  hot vinaigrette and mayonnaise,
  filling for tart, fruit or filling of meat or stable meat, which is sweet or savoury, meals (ready-cooked meals with a short shelf life),
  pudding (dry mix to be cooked),
  baby food jars/infant preparations,
  drinks,
  ready meals, meat-based or fish-based preparations, such as surimi,
  animal feeds.

The invention will be understood more clearly with the aid of the following examples which are intended to be illustrative and nonlimiting.

Materials and Methods

Measurement of the Conductivity

The method used herein is adapted from the European Pharmacopea—official edition in force—Conductivity (§ 2.2.38).

Materials:

Knick 703 electronic conductimeter also equipped with its measuring cell and checked according to the procedure described in the related instruction manual.

Procedure:

A solution containing 20 g of sample and 80 g of distilled water, having a resistivity of greater than 500 000 ohms·cm, is prepared.

The measurement is taken, at 20° C., using the conductimeter with reference to the procedure indicated in the machine's operating manual.

The values are expressed in microSiemens/cm (µS/cm).

Measurement of the Viscosity of a Starch Suspension using the Rapid Viscometer Analyzer (RVA)

This measurement is performed at acidic pH (between 2.5 and 3.5) under given concentration conditions and following a suitable temperature/time analysis profile.

Two buffer solutions are prepared:

Buffer A

The following are added to a 1 liter beaker containing 500 ml of demineralized water:
  91.0 g of citric acid monohydrate (purity >99.5%) and homogenize,
  33.0 g of sodium chloride (purity >99.5%), and homogenize until fully dissolved,
  300.0 g of 1N sodium hydroxide.

The contents are transferred into a 1 L graduated measuring cylinder and made up to 1 L with demineralized water.

Buffer B 100 g of Buffer A are mixed with 334.0 g of demineralized water.

The product to be analyzed is prepared in the following way:

A mass of 1.37 g of the dry product to be analyzed thus obtained is introduced directly into the viscometer bowl, and the solution of Buffer B is introduced until a mass equal to 28.00±0.01 g is obtained. The mixture is homogenized with the stirring blade of the Rapid Visco Analyzer (RVA-New-Port Scientific).

The time/temperature and speed analysis profile in the RVA is then produced as follows:

| Time hh:mm:ss | Temperature ° C. | Spin speed Revolutions/minute (rpm) |
| --- | --- | --- |
|  | 50 | 100 |
| 00:00:10 | 50 | 500 |
| 00:00:20 | 50 | 960 |
| 00:00:30 | 50 | 160 |
| 00:01:00 | 50 | 160 |
| 00:05:00 | 92 | 160 |
| 00:17:00 | 92 | 160 |
| 00:20:00 | 50 | 160 |

End of test: 00:20:05 (hh:mm:ss)
Initial temperature: 50° C.±0.5° C.
Data acquisition interval: 2 seconds
Sensitivity: low The results of the measurements are given in RVU (unit used for expressing the viscosity obtained on the RVA), given that 1 RVU unit=12 cPoises (cP).

As a reminder, 1 cP=1 mPa·s.

The results will thus be presented in mPa·s.

The measurements will be of the viscosity taken "at the peak", i.e. maximum viscosity value between 4 and 6 minutes, and "on dropping", i.e. the difference between the viscosity at the peak and that measured at 17 minutes.

Example 1

Preparation of Heat-Modified Starches "A"

1) The basification of waxy corn starch is performed according to the following steps:
  Prepare a starch suspension with a solids content (SC) of 36.5%;
  Add powdered sodium carbonate to obtain a final conductivity on the powder resuspended to an SC of 20% of between 1.75 and 2 mS/cm;
  Ensure a contact time of 5 hours;
  Filter and dry to an equilibrium moisture of the starch of between 10-14%.

2) Heat treatment

The product thus obtained is heat-treated in VOMM continuous turboreactors in series, the nominal temperature of which is set at 200° C. and which are configured to subject the product to a residence time of 20 minutes, and such that the difference in temperature between the nominal temperature and the temperature of the product leaving the reactor, known as Delta T, is a value of the order of 16 to 17° C.

Process Parameters

| Exp. | Conductivity on product after impregnation, returned to 20% SC, in mS/cm | Moisture of the product before heat treatment | Delta T | Nominal T ° C. | Residence time, minutes |
|---|---|---|---|---|---|
| A-1 | 2 | 11.6 | 17 | 200 | 20 |
| A-2 | 1.75 | 10.1 | 16 | 200 | 20 |

The RVA viscosity measurements are performed and are presented in the table below.

Results

| Exp. | RVA peak (mPa · s) | RVA drop (mPa · s) |
|---|---|---|
| Waxy corn base | 1020 | 914 |
| A-1 | 577 | 63 |
| A-2 | 627 | 52 |

Example 2

Preparation of Heat-Modified Starches "B"

1) The basification of waxy corn starch is performed according to the following steps:

Prepare a starch suspension with a solids content (SC) of 36.5%;

Add powdered sodium carbonate to obtain a final conductivity on the powder resuspended to an SC of 20% of 1.2 and 1.32 mS/cm;

Ensure a contact time of 1 hour;

Filter and dry to an equilibrium moisture of the starch of between 10-14%.

2) Heat treatment

The product thus obtained is heat-treated in VOMM continuous turboreactors in series, the nominal temperature of which is set at 210° C. and which are configured to subject the product to a residence time of between 15 and 20 minutes, and such that the difference in temperature between the nominal temperature and the temperature of the product leaving the reactor, known as Delta T, is a value of the order of 21 to 23° C.

Process Parameters

| Exp. | Conductivity on product after impregnation, returned to 20% SC, in mS/cm | Moisture of the product before heat treatment, in % | Delta T | Nominal T ° C. | Residence time (minutes) |
|---|---|---|---|---|---|
| Waxy corn base | 0.03 | 12 | 0 | 0 | 0 |
| B-1 | 1.2 | 11 | 21 | 210 | 20 |
| B-2 | 1.32 | 10 | 23 | 210 | 15 |

The RVA viscosity measurements are performed and are presented in the table below.

Results

| Tests | RVA peak (mPa · s) | RVA drop (mPa · s) |
|---|---|---|
| Waxy corn base | 1020 | 914 |
| B-1 | 606 | -2 |
| B-2 | 682 | 69 |

Example 3

Preparation of Heat-Modified Starches "C"

3) The basification of waxy corn starch is performed according to the following steps:

Prepare a starch suspension with a solids content (SC) of 36.5%;

Add powdered sodium carbonate to obtain a final conductivity on the powder resuspended to an SC of 20% of 1.4 mS/cm or 1.6 mS/cm;

Ensure a contact time of 1 hour;

Filter and dry to an equilibrium moisture of the starch of between 10-14%.

4) Heat treatment

The product thus obtained is heat-treated in VOMM continuous turboreactors in series, the nominal temperature of which is set at 210° C. and which are configured to subject the product to a residence time of between 25 and 30 minutes, and such that the difference in temperature between the nominal temperature and the temperature of the product leaving the reactor, known as Delta T, is a value of the order of 22° C.

Process Parameters

| Exp. | Conductivity on product after impregnation, returned to 20% SC, in mS/cm | Moisture of the product before heat treatment, in % | Delta T | Nominal T ° C. | Residence time (minutes) |
|---|---|---|---|---|---|
| Waxy corn base | 0.03 | 12 | 0 | 0 | 0 |
| C-1 | 1.4 | 10.7 | 22 | 210 | 25 |
| C-2 | 1.4 | 10.7 | 22 | 210 | 30 |
| C-3 | 1.6 | 10.4 | 22 | 200 | 30 |

The RVA viscosity measurements are performed and are presented in the table below.

Results

| Tests | RVA peak (mPa · s) | RVA drop (mPa · s) |
|---|---|---|
| Waxy corn base | 1020 | 914 |
| C-1 | 409 | -116 |
| C-2 | 358 | -130 |
| C-3 | 282 | -94 |

Example 4

Preparation of Heat-Modified Starches "D"

The basification of waxy corn starch is performed according to the following steps:
  Prepare a starch suspension with a solids content (SC) of 36.5%;
  Add powdered sodium carbonate to obtain a final conductivity on the powder resuspended to an SC of 20% of 1.4 mS/cm;
  Ensure a contact time of 1 hour;
  Filter and dry to an equilibrium moisture of the starch of between 10-14%.
  5) Heat treatment
  The product thus obtained is heat-treated in VOMM continuous turboreactors in series, the nominal temperature of which is set at 210° C. and which are configured to subject the product to a residence time of 35 minutes, and such that the difference in temperature between the nominal temperature and the temperature of the product leaving the reactor, known as Delta T, is a value of the order of 22° C.

Process Parameters

| Exp. | Conductivity on product after impregnation, returned to 20% SC, in mS/cm | Moisture of the product before heat treatment, in % | Delta T | Nominal T ° C. | Residence time (minutes) |
|---|---|---|---|---|---|
| Waxy corn base | 0.03 | 12 | 0 | 0 | 0 |
| D | 1.4 | 10.7 | 22 | 210 | 35 |

The RVA viscosity measurements are performed and are presented in the table below.

Results

| Tests | RVA peak (mPa · s) | RVA drop (mPa · s) |
|---|---|---|
| Waxy corn base | 1020 | 914 |
| D | 274 | −182 |

In conclusion for these first four examples:

Each family of starches heat-modified according to the invention has improved stability during the process of use relative to the native starch: less gain in viscosity and less retrogradation are observed during the use of these starches.

Regarding this last point, it is in point of fact observed that the more the RVA drop tends toward 0 or becomes negative, the more the product will be functionalized and the less it will express retrogradation.

Final Conclusion Regarding the Results of these First Four Examples

The heat-modified starches of family "D" represent the products that have the greatest resistance to shear, to the acidity of the media and to the heat treatments.

The heat-modified starches of family "C" are slightly less resistant than the heat-modified starches of family "D", the heat-modified starches of family "B" are slightly less resistant than the heat-modified starches of family "C" and the heat-modified starches of family "A" are less resistant than the heat-modified starches of family "B".

The choice of the use of these starches will thus be made as a function of the intended application and thus of the shear, acidity and temperature conditions used, as will be demonstrated hereinbelow in the implementational examples.

Example 5

Comparative Study

An analysis is performed comparing the products according to the invention with commercial products of the same category, according to the following protocol:
  Resuspension of the starch at a solids content of 36.5%;
  Neutralization with 20% hydrochloric acid to pH 5.5±1;
  Filtration, washing to obtain a conductivity of less than 500 µS, drying to the conventional moisture content of the starch of between 10% and 14%.

| Exp. | % Moisture content | pH at 20% SC | Conductivity at 20% SC | RVA drop (mPa · s) | RVA peak (mPa · s) |
|---|---|---|---|---|---|
| C-1 | 11 | 6.5 | 70 | −94 | 372 |
| C-2 | 14 | 6.42 | 115 | −101 | 383 |
| D | 11 | 6.28 | 55 | −159 | 251 |
| B-1 | 10.7 | 5.73 | 130 | 8 | 564 |
| B-2 | 10.5 | 5.75 | 90 | 89 | 645 |
| A-1 | 12.3 | 6.1 | 279 | 147 | 562 |
| A-2 | 12 | 5.1 | 110 | 175 | 586 |
| NOVATION ® 2300 | 12.8 | 5.7 | 164 | −186 | 276 |
| NOVATION ® 2600 | 12.3 | 5.5 | 113 | 30 | 603 |
| CLARIA ® Plus | 12.5 | 5.7 | 114 | −132 | 399 |

15-20 minutes to obtain a compound equivalent to NOVATION® 2600

20-30 minutes to obtain a compound equivalent to CLARIA® Plus 25-35 minutes to obtain a compound equivalent to NOVATION® 2300

Product less functionalized

Dependent on the other process parameters such as the Delta T and the dose of carbonate.

Example 6

Use of Heat-Modified Starches "D" in Tomato Sauce—Ketchup

The analysis is performed on the basis of the following control recipe:

| Ingredients | Amount (%) |
|---|---|
| Tomato premix at 14.9° Brix | |
| Water | 23.0 |
| 28% tomato concentrate | 26.0 |
| Starch premix | |
| Water | 5.0 |
| Test starch | 3.2 |
| Salt | 2.0 |
| Vinegar premix | |
| 8° vinegar | 8.8 |
| Sugar syrup premix at 53.1° Brix | |
| Water | 17.0 |
| Sucrose | 15.0 |
| Total | 100 |

The Process for preparing the ketchup tomato sauce is as follows:

For a 1.5 kg batch:
1. Cooking Step on a 2 L Hotmix Pro Combi Cooker:
Nominal values: 100° C., 30 minutes, speed 1
a. Mix the premix with the tomato at speed 1-120 rpm—1 minute
b. Add the starch premixes and salt
c. Cooking 100° C., 30 minutes, at speed 1
Nominal values: 100° C., speed 2
d. Add the vinegar premix and sucrose syrup at 100° C., speed 2, until a temperature of 92° C. is reached
2. Packaging/Conditioning
Filling of 375 ml glass bottles at a temperature of 60-65° C.
3. Pasteurization
Autoclave at 85° C. for 8 minutes (equipment: Steriflow rotary bi-process Ø 900 mm—1 basket—Ref NS 911 R MP FLW STEAM, year 2017, www.steriflow.com/en; Rotation: no (static)—heat treatment by pasteurization with water cascade)
At the end, the recipe is characterized by:
Total water content: 43%
pH: 3.66
Brix: 29.5
The various starches tested are as follows:
Heat-modified starch "D" according to the invention (prepared according to example 4)
CLEARAM® CH2020 sold by the Applicant Company (acetylated adipate crosslinked waxy corn starch)
NOVATION® 2300 sold by the company Ingredion
CLARIA®+sold by the company Tate & Lyle
Evaluation of the Various Tomato Sauces is Performed by Means of the Following Measurements:
1. Level of Cooking of the Starch The level of cooking is determined by light microscopy (Leica microscope—×20 lens and ×150 amplification). The sample is dispersed in demineralized water and then colored with Lugol for the purpose of revealing the starch granules. The iodine reacts with the amylose and forms spiral-structured complexes. A blue/violet color results if the starch is rich in amylose. Otherwise, the color of the starch granules remains brown/yellow.

The light microscopy observations give various information:
check the presence and appearance of the starch granules. They may be present as "uncooked"; "slightly cooked"; "moderately cooked"; "well cooked"; "fragmented"; or "solubilized (absent)".
Observation under polarized light reveals, or otherwise, the birefringence cross of the uncooked starch granules (which makes it possible to monitor the effective cooking or otherwise of the starch).

2. Sensory Characterization

The sensory characterizations are subjective assessments and the comments in terms of visual aspect and texture (by spoon and/or in the mouth) were made by a panel of five trained people. They make it possible above all here to assess the qualities of the manufactured products and are produced here for purely illustrative purposes.

3. Viscosity

The measurements are taken on a Brookfield DV1 rotational rheometer.

In general, the rheology of food products is characterized by non-Newtonian behavior: the viscosity changes as a function of the applied level of shear.

The Brookfield viscometer is used here at three rotational speeds to confirm (or otherwise) this behavior.
Conditions of use:
Spindle: #63
Rotation speed: 5; 10; 20 rpm
Total range: 24 000; 12 000; 6000 mPa·s
Rotation time: 30 seconds
Sample temperature: 25° C. (ambient)
Vessel/glass jar amount/200 mL
Repeatability: average of three measurements. Accuracy: 5%

4. Rheology 4.a. Flow Measurement
Equipment: Anton Paar, MCR301 rheometer
Characterization of the behavior of non-Newtonian fluids. The instrument imposes a specific stress field or a strain on the fluid, and monitors the resulting strain or stress.

The results are expressed in a logarithmic-scale curve of viscosity (Pa·s) as a function of the shear rate ($\gamma$).

The noteworthy results are the viscosity at $\gamma$=10 s−1 (equivalent shear of the texture measured by spoon) and $\gamma$=40 s−1 (equivalent shear of the texture measured in the mouth).

The yield point represents the minimum stress applied to place a product or a material in motion.

It is calculated with the Herschel Bulkley modeling, using the curve of stress as a function of the shear (resulting from the flow curve).
Geometry: concentric cylinders
Analysis: Oscillation
Temperature: 20° C. (+1 minute of temperature stabilization)
Time: 10 minutes
Oscillation stress: 0.1 to 1000 Pa
Repeatability: average of three measurements
Accuracy: 5%

4.b. Viscoelastic Behavior G'/G"
Equipment: TA Instruments, DHR-2 rheometer
Characterization of the behavior of non-Newtonian fluids. The instrument imposes a specific stress field or a strain on the fluid, and monitors the resulting strain or stress.

The results are expressed in a table with a modulus of elasticity (G') which characterizes the solid part and the viscous modulus (G") which characterizes the liquid part.

The general interpretations of the analysis of the food products are "liquid-type behavior" if (G'<G") or "solid-type behavior" if (G'>G").

Geometry: concentric cylinders
Analysis: Oscillation
    Temperature: 20° C. (+1 minute of temperature stabilization)
    Stress frequency: 1 Hz
    Oscillation stress: 0.02 to 880 Pa
    Repeatability: average of three measurements
    Accuracy: 5%

Results and Discussion:

1. Cooking Behavior

The microscope allows a qualitative analysis of the level of cooking of the starch grains.

In general, no significant difference is observed between the level of cooking on exiting the Hotmix and after passage through the autoclave. The autoclave pasteurization step is thus considered a "sanitization" step rather than an additional cooking step.

The microscopic observations of the two starches CLARIA®+ and NOVATION® 2300 show starch grains that are well cooked.

The microscopic observation of CLEARAM® CH2020 shows starch grains that are well cooked, and also a certain amount of debris.

The microscopic observation of the heat-modified starch "D" according to the invention shows starch grains that are well cooked and a few raw grains.

For this product, compared with the others, less debris and slightly inferior cooking are observed. It is the most resistant of the products tested.

2. Sensory Characterization

The samples were evaluated by spoon and classified from the thickest (the most viscous) to the most fluid (least viscous).

| Samples tested | Ranking for the spoon test (thickest = 9; most fluid = 1) |
| --- | --- |
| Chemically modified waxy starch CLEARAM ® CH2020 | 8-9 |
| Heat-modified starch "D" | 8 |
| NOVATION ® 2300 | 9 |
| CLARIA ®+ | 8 |
| Standard waxy starch | 1 |

There is no significant difference, which indicates that the heat-modified starch according to the invention is an alternative to the products conventionally proposed for giving native starches properties of chemically modified starches.

3. Viscosity Measurement

The graph of FIG. 1 shows the Brookfield viscosity profile for the four products tested at the three rotation speeds (5, 10 and 20 rpm).

The overall shear-thinning behavior is confirmed: the higher the shear, the less viscous the product. For certain samples, at a speed of 10 and 20 rpm, the viscosity reaches the measurement limits (full scale).

The classification of the products (from the thickest to the most fluid), in the table below, is with tests measured at 5 rpm.

| Samples tested | Ranking for the viscosity (thickest = 8; most fluid = 1) |
| --- | --- |
| Chemically modified waxy starch CLEARAM ® CH2020 | 6-7 |
| Heat-modified starch "D" | 4 |
| NOVATION ® 2300 | 8 |
| CLARIA ®+ | 5 |
| Standard waxy starch | 1 |

Considering the entire viscosity range obtained with the various thermally inhibited starch tests (from 11 260 to 21 770 mPa-1), the heat-modified starch "D" according to the invention represents the most fluid product and NOVATION® 2300 represents the thickest product.

4. Rheology Measurements 4.a. Flow

The yield point represents the minimum stress applied to place a product or a material in motion.

It is calculated with the Herschel Bulkley modeling, using the curve of stress as a function of the shear (resulting from the flow curve)—cf. FIG. 2.

The yield points calculated from the ketchup tests are represented in the table below, classified from the thickest to the most fluid.

| Samples tested | Ranking for the flow (thickest = 8; most fluid = 1) |
| --- | --- |
| Chemically modified waxy starch CLEARAM ® CH2020 | 5-6 |
| Heat-modified starch "D" | 7 |
| NOVATION ® 2300 | 7 |
| CLARIA ®+ | 6 |
| Standard waxy starch | 1 |

The behavior of the heat-modified starch "D" according to the invention is equivalent to that of NOVATION® 2300.

On the graph of the flow results, used to determine the yield point, it is chosen to consider the viscosity at a shear rate of 10 $s^{-1}$ (shear representative of that applied by spoon).

The results are presented in the graph of FIG. 3, reproduced in the table below.

| Samples tested | Ranking for the viscosity at 10 $s^{-1}$ (thickest = 9; thinnest = 1) |
| --- | --- |
| Chemically modified waxy starch CLEARAM ® CH2020 | 8-9 |
| Heat-modified starch "D" | 5 |
| NOVATION ® 2300 | 7 |
| CLARIA ®+ | 6 |
| Standard waxy starch | 1 |

The heat-modified starch "D" has a medium viscosity value.

4.b. Viscoelastic Behavior G'/G"

For all the ketchup tests, G' is dominant, which is proof that the ketchup has "solid-type behavior".

However, they show a different viscoelastic behavior.

| Samples tested | Ranking for the G' (thickest = 9; most fluid = 1) |
| --- | --- |
| Chemically modified waxy starch CLEARAM ® CH2020 | 9 |
| Heat-modified starch "D" | 9 |
| NOVATION ® 2300 | 9 |
| CLARIA ®+ | 9 |
| Standard waxy starch | 6 |

Results in line with the preceding results.

Conclusion

The heat-modified starch "D" according to the invention has, in the ketchup sauce application, behavior equivalent to that of the chemically modified waxy starch control, and to that of the thermally inhibited starch NOVATION® 2300.

Example 7

Use of the Heat-Modified Starches "B", "C" and "D" in Stirred Fermented Yogurts or Milks Conventional stirred yogurt (or fermented milk) recipe, containing starch for a creamier texture.

| Ingredients | Composition (%) |
| --- | --- |
| Whole milk (UHT) | 91.5 |
| Sucrose | 7.5 |
| Starch | 1.0 |
| Lactic acid ferments (YF-L811, CHR Hansen) | qs |
| Total | 100.0 |

Assay of the ferments: 20 U/100 L

The designation "yogurt" or "fermented milk" does not allow the incorporation of starch in certain countries, and in this case this product will be referred to as a fermented dairy specialty.

| Test No. | Details |
| --- | --- |
| 1 | NOVATION ® 2300 (1) - the company Ingredion |
| 2 | Heat-modified starch "D" |
| 3 | Heat-modified starch "C-1" |
| 4 | Heat-modified starch "C-2" |
| 5 | Heat-modified starch "B-2" |
| 6 | CLEARAM ® CJ5025, modified starch (acetylated and phosphate crosslinked waxy corn starch) |

The tested products are (according to the names of the preceding examples):
Results and Discussion:
1. Fermentation Characteristics:

| | Initial pH at 42° C. | Final pH at 42° C. | Fermentation time |
| --- | --- | --- | --- |
| Test 1 | 6.56 | 4.60 | 5 h 20 |
| Test 2 | 6.53 | 4.60 | 4 h 20 |
| Test 3 | 6.54 | 4.60 | 4 h 20 |
| Test 4 | 6.55 | 4.58 | 4 h 20 |
| Test 5 | 6.48 | 4.54 | 4 h 55 |
| Test 6 | 6.52 | 4.60 | 4 h 10 |

A few differences are observed between the fermentation times. They are more linked to the repeatability of the tests under laboratory conditions than to the starches themselves.

2. Cooking Behavior:

The state of cooking of the starch is monitored with a light microscope (as in example 6) in the various steps of the process:
- at 60° C. before homogenization (in polarized light to visualize any raw granules)
- after homogenization and pasteurization
- after fermentation and smoothing (finished product)

To better visualize the starches, the Lugol dye is used, which stains the granules blue in the case of presence of amylose, and brown in the case of presence of amylopectin only.

The state of cooking of the starches, before homogenization (60° C.) (polarized light), does not show any significant difference.

Some starches already began to swell at 60° C. before homogenization. This is explained by the differences in swelling temperatures intrinsic to each starch.

After pasteurization, the state of cooking depends on the starch used. It should be noted that the batch corresponding to the heat-modified starch "D" according to the invention confirms the result explained in example 6. The presence of numerous raw granules indicates better resistance of these products to the heat treatment.

It should be noted that no granule fragments are observed, in any of the photographs. This means that all the granules of the various batches were not destroyed by the heat treatment or shearing.

3. Rheology Measurements

The viscosity is measured after 1 day, 7 days, 15 days and 21 days.

The values are given with an uncertainty of ±5%.

| | | Viscosity (Pa · s) | | | | |
| --- | --- | --- | --- | --- | --- | --- |
| | | 5 s−1 | 10 s−1 | 40 s−1 | 100 s−1 | 350 s−1 |
| Test 1 | Day +1 | 2.6 | 1.53 | 0.509 | 0.233 | 0.082 |
| | Day +7 | 3.45 | 1.93 | 0.581 | 0.259 | 0.089 |
| | Day +15 | 4.23 | 2.37 | 0.718 | 0.312 | 0.1 |
| | Day +21 | 3.78 | 2.13 | 0.615 | 0.272 | 0.097 |
| Test 2 | Day +1 | 3.26 | 1.82 | 0.548 | 0.247 | 0.0899 |
| | Day +7 | 3.64 | 2.03 | 0.602 | 0.267 | 0.095 |
| | Day +15 | 3.46 | 1.98 | 0.58 | 0.254 | 0.092 |
| | Day +21 | 4.09 | 2.37 | 0.671 | 0.289 | 0.1 |
| Test 3 | Day +1 | 3.64 | 1.97 | 0.585 | 0.269 | 0.0991 |
| | Day +7 | 3.4 | 1.88 | 0.555 | 0.252 | 0.093 |
| | Day +15 | 3 | 1.71 | 0.514 | 0.23 | 0.087 |
| | Day +21 | 3.9 | 2.12 | 0.607 | 0.273 | 0.103 |
| Test 4 | Day +1 | 3.34 | 1.88 | 0.541 | 0.235 | 0.0886 |
| | Day +7 | 3.57 | 2 | 0.576 | 0.249 | 0.093 |
| | Day +15 | 3.37 | 1.91 | 0.554 | 0.237 | 0.089 |
| | Day +21 | 3.56 | 2.03 | 0.578 | 0.246 | 0.093 |
| Test 5 | Day +1 | 3.64 | 1.99 | 0.588 | 0.258 | 0.089 |
| | Day +7 | 3.32 | 1.84 | 0.557 | 0.248 | 0.093 |
| | Day +15 | 4.09 | 2.2 | 0.633 | 0.269 | 0.09 |
| | Day +21 | 3.52 | 2.01 | 0.584 | 0.251 | 0.093 |
| Test 6 | Day +1 | 2.91 | 1.83 | 0.521 | 0.201 | 0.071 |
| | Day +7 | 2.82 | 1.85 | 0.535 | 0.206 | 0.072 |

-continued

| | Viscosity (Pa · s) | | | | |
|---|---|---|---|---|---|
| | 5 s−1 | 10 s−1 | 40 s−1 | 100 s−1 | 350 s−1 |
| Day +15 | 3.38 | 2.11 | 0.587 | 0.22 | 0.074 |
| Day +21 | 2.95 | 1.99 | 0.596 | 0.227 | 0.078 |

| | Hysteresis area (Pa) | | | |
|---|---|---|---|---|
| | Day +1 | Day +7 | Day +15 | Day +21 |
| Test 1 | 3222 | 3420 | 4322 | 3206 |
| Test 2 | 3139 | 3252 | 3078 | 3546 |
| Test 3 | 3065 | 2899 | 2591 | 2919 |
| Test 4 | 2970 | 2978 | 2815 | 2818 |
| Test 5 | 3183 | 2450 | 3333 | 2597 |
| Test 6 | 3045 | 2993 | 3406 | 3220 |

It is observed that, after 1 day, the least viscous tests are those based on NOVATION® 2300 and on CLEARAM® CJ5025.

However, the viscosity differences remain small, and are not constant on storage.

4. Sensory Characterization

The panel consisted of 29 people among the Roquette staff. During the tasting of the products, 11 and then 13 people participated in the two different sessions.

The panel is qualified for tasting formulated products. The group was trained to check its performance in terms of:

Capacity to discriminate between the products

Consensus, correct use of the descriptors

Repeatability, ability to detect a product submitted twice

Tasting Conditions:

The sensory analysis takes place in a dedicated laboratory, with individual cubicles, a calm, odor-free environment (to aid concentration) and white lighting.

The tasting is performed blind with a three-figure code, and the products are presented in a random order, to avoid persistence effects.

Moreover, the tasting of the tests was performed in two series, to avoid saturation during the session:

Series 1: NOVATION® 2300, heat-modified starch "D", heat-modified starch "C-1", heat-modified starch "C-2"

Series 2: NOVATION® 2300, heat-modified starch "B-2", CLEARAM® CJ5025

Method: Flash Profile (JM Siefermann, 2000)

The analysis of the results is performed by multiple-factor analysis (J. Pagès, 1994), and shows that:

On Series 1:

The three descriptors "glossy", "milky taste" and "astringent" are not discriminating on this series of products.

The yogurts formulated with the heat-modified starches "C-1" and "C-2" are similar, they are creamier, sweeter, more fatty and more granular than the other products. The heat-modified starch "C-1", however, gives a product that is more fondant, less acidic and less thick than the heat-modified starch "C-2".

The heat-modified starch "D" is as unacidic as the heat-modified starch "C-1".

On Series 2:

The five descriptors "glossy", "sweet", "fondant", "milky taste" and "astringent" are not discriminating on this series.

However, the panel members established the following differences:

The heat-modified starch "B" is very thick, granular, acidic, with a creamy and coating texture, NOVATION® 2300 has a similar sensory profile, but is less acidic and less granular, CLEARAM® CJ5025 is the product that is the least granular, the least thick and the least fatty.

This result can be aligned with the microscopic observations of the granules: the CLEARAM® CJ5025 granules were not very swollen, and thus afford less viscosity than the others.

The conclusions of this study are that all the starches tested appear to have withstood the process used here, since no starch fragments were observed.

The starches according to the invention have, for some of them, characteristics similar to those of the already-existing product: thus, the heat-modified starch "D" differs only in a slightly higher acidity of the yogurt.

Similarly, the heat-modified starch "C-1" leads to products that are similar to the existing product.

The heat-modified starch "C-2" even makes it possible to achieve levels of creaminess perceived to be superior. It could thus be used at a lower dose for the same result.

Example 8

Use of a Heat-Modified Starch "D" in Tomato Sauce—Meat-Free Bolognese

The base recipe used is as follows:

| Ingredients | |
|---|---|
| Tomato pulp | 50 |
| Water | 28.2 |
| 28% tomato concentrate | 10 |
| Onion (chopped, frozen) | 6 |
| 8° vinegar | 1.2 |
| Olive oil | 1 |
| Starch | 2.2 |
| Salt | 0.8 |
| Garlic powder | 0.2 |
| Parsley leaves (1-2.5 mm) | 0.2 |
| Oregano leaves (dried) | 0.1 |
| Thyme leaves (dried) | 0.1 |
| TOTAL | 100 g |

The various starches tested are as follows:

Heat-modified starch "D" according to the invention (prepared according to example 4)

CLEARAM® CH2020 sold by the Applicant Company (acetylated adipate crosslinked waxy corn starch)

NOVATION® 2300 sold by the company Ingredion

The procedure for the recipe is as follows:

1. Preparation of the premixes:
   a. Tomato pulp & onions
   b. Water & other liquid ingredients
   c. Powders
2. Make a fluid purée of the Premix (tomato pulp & onions) using a Hotmix blender (speed 6 for 1 minute). The premix must be free of particles so as not to interfere during the rheological analysis of the product.
3. Add the premix (Water & other liquid ingredients)
4. Place at speed 3 for 1 minute
5. Add the powder premix (at speed 3 for 1 minute)
6. Precook (speed 3/10 minutes/80° C.)

7. The optional treatments are as follows:

| | | |
|---|---|---|
| A. | PASTEURIZATION + STORAGE IN A FREEZER (−18° C.) + THAWING<br>Place 150 g in a glass jar (277 ml)<br>Keep in a water bath at 60° C.<br>Pasteurize in an autoclave in "superheated water" mode with a stage at 85° C., 45 minutes in Stocker static at −18° C. (overnight*)<br>Next, thaw over 4 hours at room temperature.<br>Observation and analysis on D + 1<br>(*Except for rheology analysis. The product is stored overnight at −18° C. before the sensory analysis. For the rheological analysis, the product is thawed after 1 month) | Steriflow parameters:<br>Static; Z = 10° C.; T = 90° C.<br>Phase 1: Heating/85° C./0.1 bar/8 min<br>Phase 2: Step/85° C./0.1 bar/45 min<br>Phase 3: Cooling/45° C./0.1 bar/20 min<br>Phase 4: Forced cooling/0° C./0.1 bar/5 min |
| B. | PASTEURIZATION + AMBIENT STORAGE (20° C.)<br>Place 150 g in a glass jar (277 ml)<br>Keep in a water bath at 60° C.<br>Pasteurize in an autoclave in "superheated water" mode with a stage at 85° C., 45 minutes in static Store at 20° C.<br>Observation and analysis on D + 1 | Steriflow parameters:<br>Static; Z = 10° C.; T = 90° C.<br>Phase 1: Heating/85° C./0.1 bar/8 min<br>Phase 2: Step/85° C./0.1 bar/45 min<br>Phase 3: Cooling/45° C./0.1 bar/20 min<br>Phase 4: Forced cooling/0° C./0.1 bar/5 min |
| C. | STERILIZATION + AMBIENT STORAGE (20° C.)<br>Place 150 g in a glass jar (277 ml)<br>Keep in a water bath at 60° C.<br>Pasteurize in an autoclave in "superheated water" mode with a stage at 120° C., 60 minutes in Stocker static at 20° C.<br>Observation and analysis on D + 1 | Steriflow parameters:<br>Static; Z = 10° C.; T = 121° C.<br>Phase 1: heating/120° C./1.7 bar/12 min<br>Phase 2: Step/120° C./1.7 bar/60 min<br>Phase 3: Cooling/45° C./0.1 bar/20 min<br>Phase 4: Forced cooling/0° C./0.1 bar/5 min |

Equipment for the Heat Treatment:
 Autoclave,
 rotational twin-process Steriflow ⌀900 mm—1 basket—1 door
 The internal control system of the Steriflow machine (MPI Expert) is used to manage the process cycles.
 By means of the temperature probes placed at the center of the product (coldest point), the machine records the useful data during the cycle for the purposes of the study:
  Start Temperature=Start T° C.: to check the correct reproducibility of the sample production process
  Maximum Temperature=Max T° C.: to check the maximum temperature reached at the center of the product,
  MAX $F_0$ (minutes): This value gives information regarding the intensity of the heat treatment. It represents the exposure time of the product to a treatment leading to the same reduction in the number of microorganisms achieved at the reference temperature (i.e. 121.1° C. which is the temperature of destruction of *Clostridium botulinum*). The term "pasteurizing value or PV" is used in the case of pasteurization, or "sterilizing value or SV" in the case of sterilization.
  For example, a sterilizing value of 3 minutes means that the experiment performed is equivalent to an experiment lasting 3 minutes at a constant temperature equal to the reference temperature (121.1° C.).

$$F_0 = \Delta T * 10^{(T-121/Z)}$$

The "MAX $F_0$" is the sum of all of the values across the entire cycle, calculated with the values of Z and of the reference temperature (T)
Equipment for the Colorimetry Measurements:
 Equipment: Konica Minolta, CM-5 spectrophotometer
 Color analysis method: L* a* b* colorimetric space/ΔE: CIE 2000
 Sample: 6 g of powder, wrapped, in a Petri dish (Konica Minolta ref. 1870-712, glass, diameter 40 mm)
 Measurement zone: ⌀30 mm, with ⌀35 mm sighting mask
 Type of measurement: reflectance; method: Petri dish
 Observer: 10°/D65
 Repeatability: 0.004
 The lightness, L*, represents the darkest black at L*=0, and the brightest white at L*=100.
 The color channels, a* and b*, represent the true values of neutral grays at a*=0 and b*=0.
 The color difference ΔE (delta E) is calculated between the color of a chosen sample L1a1b1 and the reference color L2a2b2.
 The result is calculated by means of the online calculator www.brucelindbloom.com ("calc"/"Color Difference Calculator" section), where the "CIE 2000" result is used.
 The smaller the ΔE value, the more similar the color of the two products.
 If ΔE is >1.5, the color difference is considered to be perceptible to the human eye.
Sensory Characterizations:
 The sensory characterizations are subjective assessments and comments in terms of visual aspect and texture (by spoon and/or in the mouth).
Syneresis Measurements
 Depending on the resistance of the starch to the process (freezing and/or heat treatment), a certain amount of syneresis (release of water) may take place.
 The product is screened (fine mesh) for 6 minutes, the amount of phases is weighed and the result is given as a percentage.
 After screening and weighing the syneresis, the two phases (syneresis water and remaining sauce) of the sample are returned into a tank.
 The sensory nature is evaluated primarily on the remaining sauce phase (the sauce may be more concentrated or thicker).

Level of Cooking of the Starch

The level of cooking is determined by microscopy, as in the above example 5.

Measurement of the Rheoloqy

Characterization of the behavior of non-Newtonian fluids: the instrument imposes a specific stress field or a strain on the fluid, and monitors the resulting strain or stress.

Geometry: CC27 concentric cylinders

Analytical conditions: All the samples were analyzed for the rheology 1 day after the production date, after stabilization at 20° C.

Repeatability of all the analyses: mean of three measurements

Accuracy: 5%

Viscosity as a Function of the Stress—Fluidity Measurement

The results are expressed by a logarithmic-scale curve giving the viscosity (Pa·s) as a function of the shear rate (γ).

The noteworthy results are the viscosity at:

$\gamma=5$ s$^{-1}$ (shear representative of the product at rest)
$\gamma=10$ s$^{-1}$ to 40 s$^{-1}$ (shear representative of that applied in the mouth during chewing)
$\gamma=100$ s$^{-1}$ (shear representative of that applied by spoon)
$\gamma=350$ s$^{-1}$ (shear representative of that applied in industrial processes—i.e. pumps)

Yield Point

The yield point represents the minimum stress applied to place a product or a material in motion. The lower the result, the lower will be the effort required to place it in motion.

It is calculated with the Herschel Bulkley modeling, using the curve of stress as a function of the shear (resulting from the flow curve).

Viscoelastic Characterization

The results of the viscoelastic behavior (G'/G") are expressed in a table with a modulus of elasticity (G') which characterizes the solid part and the viscous modulus (G") which characterizes the liquid part.

The general interpretations of the analysis of the food products are "liquid-type behavior" if (G'<G") or "solid-type behavior" if (G'>G").

The results are as follows:

1. Heat Treatment Data (Pasteurization Values/Sterilization Values)—Measurement of the Start T° C./MaxT° C./Max $F_o$

| | Pasteurization | | | Sterilization | | |
|---|---|---|---|---|---|---|
| Sample | Start T° C. | Max T° C. | Max $F_0$ (VP) | Start T° C. | Max T° C. | Max $F_0$ (VS) |
| CH2020 | — | — | — | — | — | — |
| Heat-modified starch "D" | 57.9 | 82.6 | 5.29 | 59.8 | 117.5 | 13.422 |
| NOVATION® 2300 | 57.8 | 82.3 | 5.01 | 61.5 | 117.4 | 13.491 |

These results reflect:

good reproducibility of the treatment method. The start temperatures are about 57-61° C. for all the tests.

A sufficient duration of the step phase (for the pasteurization and the sterilization). The maximum temperature is close to the set temperature.

Furthermore, the heat-modified starch "D" according to the invention has behavior equivalent to that of a conventional thermally inhibited starch.

2. Colorimetric Analysis

The color difference ΔE (delta E) is calculated between the color of a chosen sample L1a1b1 and the reference color L2a2b2.

It was calculated at four different viewpoints in order to have the fullest comparison:

ΔE: (repro CH20): Repeatability study for two batches of CLEARAM® CH2020

ΔE of the comparative study between the reference modified CLEARAM® CH2020 prototypes and the heat-modified starch "D".

ΔE of the comparative study between NOVATION® 2300 and the heat-modified starch "D".

ΔE of the comparative study between the reference modified CLEARAM® CH2020 and NOVATION® 2300.

The results are shown in FIG. 4.

It should be noted that the smaller the value of ΔE, the more similar the colors of the two products. If the ΔE>1.5, the color difference is considered to be perceptible to the human eye.

Only the ΔE results of the repeatability study for CLEARAM® CH2020 (ΔE (repro CH20)) are less than 1.5. All the other ΔE results are very discriminating:

The color of CLEARAM® CH2020 is significantly similar between the batches.

The heat-modified starch "D" has a color that is significantly different from that of CLEARAM® CH2020.

The heat-modified starch "D" has a color that is significantly different from that of NOVATION® 2300, but comparatively less pronounced than that of CLEARAM® CH2020.

The color of CLEARAM® CH2020 is significantly different from that of NOVATION® 2300, but less pronounced relative to the heat-modified starch "D", with a lower lightness and lower color saturation between the CLEARAM CH2020 prototypes and the heat-modified starch "D".

3. Sensory Evaluation

As a reminder, the products underwent the three different treatment options, and were observed on day +1 at 20° C.

| | With CLEARAM CH2020 | | |
|---|---|---|---|
| Treatment options | Pasteurized at 85° C. + freezing and thawing | Pasteurized at 85° C. | Sterilized at 120° C. |
| Visual aspect | Dark red + Glossy ++ Smooth 0 (with microgels) Syneresis ++ (10%) | Dark red 0 Glossy ++ Smooth + Syneresis 0 | Dark red ++ (heterogeneous) Glossy + Smooth + Syneresis 0 |
| Texture by spoon | Gelled 0 Thick +++ Coating + | Gelled 0 Thick ++ Coating ++ | Gelled + Thick + Coating + |
| Texture in the mouth | Thick +++ Watery 0 Creamy + Granular + Tacky + | Thick ++ Watery + Creamy +++ Granular 0 Tacky + | Thick + Watery + Creamy ++ Granular 0 Tacky 0 |

| | With the heat-modified starch "D" | | |
|---|---|---|---|
| Treatment options | Pasteurized at 85° C. + freezing and thawing | Pasteurized at 85° C. | Sterilized at 120° C. |
| Visual aspect | Dark red + Glossy + Smooth 0 Syneresis + (9.4%) | Dark red 0 Glossy + Smooth ++ Syneresis 0 | Dark red ++ (heterogeneous) Glossy + Smooth + Syneresis 0 |

-continued

With the heat-modified starch "D"

| Treatment options | Pasteurized at 85° C. + freezing and thawing | Pasteurized at 85° C. | Sterilized at 120° C. |
|---|---|---|---|
| Texture by spoon | Gelled ++<br>Thick +++<br>Coating ++ | Gelled +<br>Thick ++<br>Coating ++ | Gelled +<br>Thick +<br>Coating + |
| Texture in the mouth | Thick +++<br>Watery 0<br>Creamy ++<br>Granular +<br>Tacky 0 | Thick ++<br>Watery 0<br>Creamy ++<br>Granular 0<br>Tacky 0 | Thick +<br>Watery 0<br>Creamy ++<br>Granular 0<br>Tacky 0 |

With NOVATION 2300

| Treatment options | Pasteurized at 85° C. + freezing and thawing | Pasteurized at 85° C. | Sterilized at 120° C. |
|---|---|---|---|
| Visual aspect | Dark red ++<br>Glossy 0<br>Smooth 0<br>Syneresis +++ (17.9%) | Dark red +<br>Glossy +<br>Smooth +<br>Syneresis 0 | Dark red +++<br>(heterogeneous)<br>Glossy ++<br>Smooth +<br>Syneresis 0 |
| Texture by spoon | Gelled +++<br>Thick +++<br>Coating 0 | Gelled ++<br>Thick +<br>Coating ++ | Gelled ++<br>Thick ++<br>Coating + |
| Texture in the mouth | Thick +++<br>Watery 0<br>Creamy 0<br>Granular ++<br>Tacky 0 | Thick ++<br>Watery 0<br>Creamy +<br>Granular 0<br>Tacky 0 | Thick +<br>Watery 0<br>Creamy 0<br>Granular 0<br>Tacky 0 |

The pasteurized sample will be taken as reference since it is considered to be the closest to the intended target for this type of matrix in terms of visual aspect and texture.

All the frozen and thawed samples present syneresis, and also a granular, micro-gelled texture, etc.

The heat-modified starch "D" has, compared with the other two products:
 less syneresis
 a more coating, less tacky texture, during freezing/thawing All the sterilized products have a more fluid texture and a heterogeneous darker red color (associated with a more pronounced Maillard reaction).

4. Rheological Study

The histograms presented in the following figures show the means of the results for each test, under three parameters: viscosity as a function of the stress, yield point and viscoelastic nature.

FIG. 5: Viscosity as a Function of the Stress

The results show good repeatability of the results of the three repetitions for each sample.

The histogram is a complete and simplified view (mean of three repetitions). Each bar represents a noteworthy viscosity result (5; 10; 100; 350 s−1).

All the samples, for the two heat treatments, have shear-thinning behavior (the viscosity decreases as the shear rate increases).

The sterilized samples (S) are more fluid than their pasteurized samples (P). The heat treatment has an influence on the rheological behavior, irrespective of the starch.

For the pasteurized and sterilized samples, NOVATION® 2300 presents results inferior to those of the reference CLEARAM® CH2020.

The heat-modified starch "D" has a lower viscosity than that of NOVATION® 2300, except under the sterilization conditions where the heat-modified starch "D" appears to be slightly thicker.

The group classification shows that the heat-modified starch "D" and NOVATION® 2300 have similar performance qualities under the pasteurization conditions.

FIG. 6: Yield Point

As for the preceding analytical results (viscosity as a function of the stress), there is a similar profile in the classification of the products:

The sterilized samples (S) have a yield point that is slightly lower than that of the pasteurized samples (P). The heat treatment has an influence on the rheological behavior: reduced resistance of the starch to this high heat treatment.

For the pasteurized samples, NOVATION® 2300 presents moderate results, between the CLEARAM® CH2020 reference prototypes and the heat-modified starch "D".

The heat-modified starch "D" appears to be the most efficient and the closest to the reference products (CLEARAM® CH2020 and NOVATION® 2300).

FIG. 7: Viscoelastic Characterization

For each test, G' is dominant relative to G", which is proof that the product has "solid-type behavior".

The histogram focuses only on the value G'.

As for the flow analytical results, there is a similar profile in the classification of the products:

The sterilized samples (S) have lower cohesion than their pasteurized samples (P). The heat treatment has an influence on the rheological behavior, by damaging the starch. Globally, all the heat-treated starches are less resistant to the sterilization treatment.

For the pasteurized samples, NOVATION® 2300 shows cohesion that is quite close to that of CLEARAM® CH2020.

The heat-treated starch "D" appears to be coherent.

For the sterilized samples, NOVATION® 2300 shows cohesion that is closer to that of the heat-treated starch "D".

Final Conclusion for the Rheological Analysis:

The conditions of the sterilization process defined for this study appear to be a discriminating parameter.

This treatment option makes it possible to go further in the discrimination of the clean starches between each other and in comparison with CLEARAM® CH2020 and NOVATION® 2300.

The heat-treated starch "D" is classified in the category of thermally modified reference products, like NOVATION® 2300.

Example 9

Use of the Heat-Modified Starches "C" in Thermized Yogurts

The heat-modified starches obtained by means of the process according to the invention were tested in thermized yogurts, also known as ambient yogurts or extended shelf life yogurts.

These yogurts are subjected to a heat treatment after fermentation, which makes it possible to conserve them at room temperature for several months.

The various starches tested are as follows:
 Heat-modified starch "C" according to the invention (prepared according to example 3);
 CLEARAM® CJ5025 sold by the Applicant Company (acetylated distarch phosphate), modified starch conventionally used in room-temperature-stable drinking yogurt applications—cf. https://www.roquette.com/food-and-nutrition/dairy/texturizing-solutions/; NOVATION® 2300 sold by the company Ingredion.

The recipe is as follows:

The starches are tested in a strawberry-flavored drinking yogurt, containing fruit concentrate.

| % Composition | Recipe |
|---|---|
| Water | 64.1 |
| Concentrated strawberry purée (18° Brix) | 11.2 |
| Sucrose | 7.4 |
| Cream (35% fat) | 6.0 |
| Powdered skimmed milk | 5.5 |
| Pectin solution (3%) | 3.8 |
| Starch | 2.0 |
| Lactic acid ferments (YF-L904, CHR Hansen) | qs |
| Total | 100.00 |

Preparation Process:
  Hydration of the ingredients (powdered milk, sugar, pectin and starch) in the milk at 50° C. for 30 minutes
  Addition of the cream, mixing for 5 minutes with a Silverson mixer (3500 rpm).
  Homogenization: 100 bar at 65 or 60° C. according to the starch used
  Pasteurization at 95° C., 7 minutes in a plate exchanger at 30 L/h
  Addition of the lactic acid ferments to the mix at 42° C. (20 U/200 L)
  Fermentation at 42° C. until pH 4.5 is reached
  Addition of the strawberry purée concentrate
  Thermization: preheating to 60° C., thermization at 85° C. for 30 seconds in a plate exchanger at 30 L/h
  Cooling to 50° C.
  Packaging and storage at room temperature Characteristics of the Process and of the Fermentation:

|  | T ° C. homogenization | Initial pH at 42° C. | Final pH at 42° C. | Fermentation time |
|---|---|---|---|---|
| CLEARAM ® CJ5025 | 65° C. | 6.45 | 4.47 | 4 h |
| NOVATION ® 2300 | 60° C. | 6.46 | 4.50 | 4 h |
| Heat-modified starch "C". | 60° C. | 6.42 | 4.50 | 4 h |

There is no impact of the starch on the fermentation time. The three products reach the desired pH in an equivalent time.

Visual Aspect:
  Before addition of the strawberry purée, the products have a slightly beige white color.

State of Cooking of the Starch:
  The state of cooking of the starch is monitored with a light microscope in the various steps of the process
    After homogenization and first heat treatment (pasteurization)
    After the second heat treatment (thermization)
  The preparation is colored with Lugol to improve the visualization of the starches.
    After pasteurization, the starch granules are, on the whole, satisfactorily swollen. The least swollen is the modified starch (CLEARAM® CJ5025). No fragments are observed.
  After the Second Heat Treatment
    Satisfactorily swollen granules are observed in the three products. No starch fragments are visualized. The starches satisfactorily withstood the heat treatments.

The NOVATION® 2300 granules appear on average slightly less swollen than those of the heat-modified starch C.

Rheological Measurements

| Rheometer: | Temperature measurement: 20° C. Anton Paar Physica MCR 301 |
| Geometry: | CC27 |
| Method: | 0 to 350 s$^{-1}$ in 180 s and 350 s$^{-1}$ to 0 s$^{-1}$ in 180 s |

The viscosity is measured after 1 day, 7 days, 15 days and 30 days. The values are given with an uncertainty of ±5%.

|  |  | Viscosity (Pa · s) | | | |
|---|---|---|---|---|---|
|  |  | 5 s–1 | 10 s–1 | 40 s–1 | 100 s–1 |
| CLEARAM ® CJ5025 | J + 1 | 2.530 | 1.530 | 0.544 | 0.297 |
|  | J + 7 | 2.690 | 1.630 | 0.571 | 0.309 |
|  | J + 15 | 1.360 | 0.871 | 0.330 | 0.187 |
|  | J + 30 | 1.770 | 1.080 | 0.397 | 0.223 |
| NOVATION ® 2300 | J + 1 | 2.910 | 1.780 | 0.612 | 0.340 |
|  | J + 7 | 3.570 | 2.180 | 0.736 | 0.396 |
|  | J + 15 | 3.600 | 2.210 | 0.744 | 0.397 |
|  | J + 30 | 3.320 | 2.120 | 0.708 | 0.376 |
| Heat-modified starch "C". | J + 1 | 3.250 | 1.890 | 0.689 | 0.383 |
|  | J + 7 | 3.710 | 2.150 | 0.757 | 0.408 |
|  | J + 15 | 3.560 | 2.030 | 0.721 | 0.389 |
|  | J + 30 | 3.090 | 1.760 | 0.634 | 0.344 |

FIG. 8 presents the graph of the viscosities at 40 s$^{-1}$.

The two tests containing starch without chemical modification have similar viscosities.

On the other hand, the test with CLEARAM® CJ5025 is less viscous at all the storage times.

The change in the viscosities shows that there is no retrogradation of the starch in the yogurts since an increase in viscosity would then be observed on storage.

Water-Holding Capacity

The water-holding capacity of the yogurts is analyzed by performing the following test, adapted from a method of Harte and Barbosa-Canovas:
  Centrifugation of a mass W1 of yogurt for 30 minutes at 4000 g and at 10° C.
  Weighing of the whey separated out after the centrifugation: W2
  Water-holding capacity: WHC (%)=(1−W2/W1)×100

|  | D + 1 | D + 7 | D + 15 | D + 30 |
|---|---|---|---|---|
| CLEARAM ® CJ5025 | 76.07 | 74.31 | 72.53 | 68.97 |
| NOVATION ® 2300 | 68.60 | 66.26 | 70.13 | 66.86 |
| Heat-modified starch "C". | 74.94 | 74.19 | 72.06 | 72.17 |

It is found that the water-holding capacity of the starch according to the invention is close to that obtained with the modified starch.

It is moreover stable on storage, which confirms the absence of syneresis. However, the competing starch retains slightly less water.

Tasting of the Yogurts

The three products were evaluated by expert dairy product tasters. The comments collected are as follows:

CLEARAM® CJ5025: astringent, coating, sparingly acidic

NOVATION® 2300: acidic, astringent, mediocre thickness in the mouth

Heat-modified starch "C": sparingly acidic, sparingly astringent, mild, thick in the mouth.

This tasting makes it possible to confirm that the starchs used do not introduce any foreign taste into the yogurt.

On the other hand, they are distinguished as regards the perceived acidity, NOVATION® 2300 being the one which affords the most acidity.

The heat-modified starch "C" makes it possible to obtain a yogurt of more outstanding taste quality.

In summary, the heat-modified starch according to the invention thus has performance at least equivalent to that of the modified or unmodified starch conventionally used in this application, and proves to be organoleptically more acceptable than NOVATION® 2300.

Example 10

Use of the Heat-Modified Starches "C" in Low-Fat Mayonnaises According to a Hot Process The heat-modified starches obtained with the process according to the invention were tested in mayonnaises prepared via a hot process, these mayonnaises having a low fat content (25-35% fat).

The various starches tested are as follows:
Heat-modified starch "C" according to the invention (prepared according to example 3);
CLEARAM® CH2020 sold by the Applicant Company (acetylated adipate crosslinked waxy corn starch);
NOVATION® 2300 sold by the company Ingredion.

The recipe is as follows:

| Ingredients | % Composition |
| --- | --- |
| Phase A (starch milk) | |
| Water | 50.13 |
| Starch | 4.00 |
| Phase B (solution) | |
| Mustard | 2.50 |
| Sucrose | 6.00 |
| Powdered egg yolk from the company Liot | 1.20 |
| Potassium sorbate from the company Alfa Aesar | 0.12 |
| Phase C (dispersion) | |
| Sunflower oil | 25.00 |
| Xanthan gum (F80) sold by the company AGI - E415 | 0.30 |
| Phase D (for solution) | |
| 87° vinegar | 6.50 |
| Lemon juice | 2.50 |
| Total | 100.00 |

Preparation Process:

Suitable for amounts of from 800 g to 2 kg, a batch of 1 kg of low-fat mayonnaise is prepared here.

Use of the 2 L Hotmix Pro Creative mixer (speed 1E=480 rpm; speed 3: 800 rpm; speed 4: 1800 rpm; speed 5: 3000 rpm; speed 6: 4000 rpm).

Phase A: cook the starch milk in the bowl of the Hotmix machine (speed 1E, 90° C., 10 minutes). Leave to cool to 50° C.

Phase B: prepare the liquid ingredients (starch paste and mustard) in the bowl of the Hotmix machine. Prepare the powders in a separate vessel.

Disperse thoroughly and homogenize this powder mix.

Prepare phases C and D in separate vessels.

Hydration of Phase B

Add the powder mixture to the Hotmix bowl in which the starch milk is maintained at 50° C., and mix at speed 3 for 1 minute.

Emulsification+Hydration of the Hydrocolloids

Add Phase C and then Phase D portionwise via the top of the vessel.

Change the speed from 4 to 6, depending on the consistency of the product, without exceeding a mixing time of 3 minutes.

Finishing of the Emulsification:

Continue mixing at speed 6 for 1 minute.

Analysis Methods

Sensory Characterizations

The sensory characterizations are subjective assessments and comments in terms of visual aspect and texture (by spoon and/or in the mouth).

Colorimetry

Equipment: Konica Minolta, CM-5 spectrophotometer
Color analysis method: $L^*$ $a^*$ $b^*$ and $L^*$ $C^*$ $h°$ colorimetric space/$\Delta E$: CIE 2000
Sample: 20 g, in a disposable Petri dish (VWR, "round PS Petri dish without lugs", plastic, 55 mm diameter)
Measurement zone: ⌀ 30 mm, with ⌀ 35 mm sighting mask
Type of measurement: reflectance; specular component excluded (SCE)
Observer: 10°/Illuminant: D65
Repeatability: 0.004

The lightness, $L^*$, represents the darkest black at $L^*=0$, and the brightest white at $L^*=100$.

The color channels, $a^*$ and $b^*$, represent the coordinates of a color. The values $a^*=0$ and $b^*=0$ represent true neutral gray.

$C^*$ represents the chrominance. The difference $\Delta C^*$ between two samples is considered to show a lighter (+) or darker (−) color. (May be illustrated as the amount of pigments)

$h°$ represents the hue angle (in degrees), which is precisely the color.

The colorimetric space differences ($L^*$ $C^*h°$) are easier to read and to interpret than
the colorimetric space ($L^*$ $a^*$ $b^*$).

The color difference $\Delta E$ (delta E) is calculated between the chosen sample color $L_1$ $a_1$ $b_1$ and the reference color $L_2$ $a_2$ $b_2$ (or $L_1$ $C_1$ $h_1$ and $L_2$ $C_2$ $h_2$).

The result is calculated with the Colibri® Color software from Konica, in which the "CIE 2000" formula is used (the closest to the perception of the human eye).

The smaller the $\Delta E$ value, the more similar the color of the two products.

If $\Delta E$ is >1.5, the color difference is considered to be perceptible to the human eye.

The analyses were performed on mayonnaises at 15° C.

Level of Cooking of the Starch—Light Microscope

Equipment: Leica

The sample is dispersed in demineralized water and then colored with Lugol in order to reveal the starch granules. The iodine reacts with the amylose and forms spiral-structured complexes. A blue/violet color results if the starch is rich in amylose. Otherwise, the color of the starch granules remains brown/yellow.

The light microscopy observations give various information:
- to show the sizes and the dispersion of the oil bubbles. The smaller and the more homogeneous the emulsification, the more efficient the emulsification.
- to check the presence and appearance of the starch granules. They may be present as uncooked; slightly cooked; moderately cooked; well cooked; as fragments; or solubilized (absent).
- Observation under polarized light reveals, or otherwise, the birefringence cross of the uncooked starch granule (which makes it possible to monitor the effective cooking or otherwise of the starch).

White light—×20 lens—magnification ×150

Rheology

Characterization of the behavior of non-Newtonian fluids. The instrument imposes a specific stress or a strain on the fluid, and monitors the resulting strain or stress.

Analytical conditions: All the samples were analyzed for the rheology 1 day after the production date.

Repeatability of all the analyses: mean of three measurements

Accuracy: 5%

Flow

The flow results are expressed in a logarithmic-scale curve of viscosity (Pa·s) as a function of the shear rate ($\gamma$).

Noteworthy viscosity results may be noted at the following shear rates:
- $\gamma=5$ s$^{-1}$ (equivalent shear of texture measured for the product at rest)
- $\gamma=10$ s$^{-1}$ at 40 s$^{-1}$ (equivalent shear of texture measured during chewing—mouthfeel)
- $\gamma=100$ s$^{-1}$ (equivalent shear of texture measured during stirring—sensory nature by spoon)
- $\gamma=350$ s$^{-1}$ (equivalent shear of texture measured during industrial processes—i.e. pumps)

Apparatus and Analytical Method:

| | |
|---|---|
| | Temperature measurement: 15° C. |
| Rheometer: | TA Instrument DHR-2 rheometer |
| Geometry: | Cone/plate 4 cm 1° |
| Method: | 1 minute at constant temperature |
| | Ramp from 0.6 to 350 s$^{-1}$ over 1 minute, stable at 350 s$^{-1}$ for 3 minutes, 350 to 0.6 s$^{-1}$ over 1 minute |

Yield Point

The yield point represents the minimum stress applied to place a product or a material in motion. The lower the result, the lower will be the effort required to place it in motion.

It is calculated with the Herschel Bulkley modeling, using the curve of stress as a function of the shear (resulting from the flow curve).

Apparatus and Analytical Method:

| | |
|---|---|
| | Temperature measurement: 15° C. |
| Rheometer: | TA Instrument DHR-2 rheometer |
| Geometry: | Cone/plate 4 cm 1° |
| Method: | 1 minute at constant temperature |
| | 0.1 to 20 Pa for a ramp of 8 minutes |

Oscillation

The results of the viscoelastic behavior (G'/G") are expressed in a table with a modulus of elasticity (G') which characterizes the solid part and the viscous modulus (G") which characterizes the liquid part. The general interpretations of the analysis of the food products are "liquid-type behavior" if (G'<G") or "solid-type behavior" if (G'>G").

Apparatus and Analytical Method:

| | |
|---|---|
| | Temperature measurement: 15° C. |
| Rheometer: | TA Instrument DHR-2 rheometer |
| Geometry: | Cone/plate 4 cm 1° |
| Method: | 1 minute at constant temperature |
| | 0.02 to 880 Pa 1 Hz oscillatory stress |

Results

Sensory Evaluation (h+12 hours)

| TESTS | | CLEARAM® CH2020 | Heat-modified starch "C" | NOVATION® 2300 |
|---|---|---|---|---|
| Visual aspect | Dark color | 0 | ++ | + |
| | Glossy | 0 | 0 | 0 |
| | Smooth | 0 | 0 | 0 |
| Texture by spoon | Gelled | 0 | 0 | 0 |
| | Thick | + | 0 | + |
| | Coating | 0 | 0 | 0 |
| Texture in the mouth | Thick | ++ | 0 | + |
| | Creamy | 0 | 0 | 0 |
| | Granular | 0 | 0 | 0 |
| | Gluey | + | 0 | 0 |
| | Fatty | 0 | 0 | 0 |
| Taste | Off-note | 0 | 0 | 0 |

Comments:

After use: On account of the temperature starting from 50° C. and of the shear process, the product is hot and quite fluid, more particularly for the thermally inhibited starch and the heat-modified starch "C" according to the invention.

After 12 hours of maturation at +5° C.: The products are equivalent, with the exception of a darker color for the thermally inhibited starch and the heat-modified starch "C" according to the invention. Furthermore, for the texture by spoon, the mayonnaise made with the heat-modified starch "C" appears a little more fluid.

For the texture in the mouth, the thermally inhibited starch and the heat-modified starch "C" according to the invention show virtually no difference, and the control with CLEARAM® CH2020 has a slightly thicker and more tacky texture.

There is no after-taste for the thermally inhibited starch and the heat-modified starch "C" according to the invention.

The modified starch CLEARAM® CH2020 is less damaged during the process. Moreover, for an equivalent dose, the thermally inhibited starch and the heat-modified starch "C" according to the invention have reduced viscosity performance.

Colorimetry
Values as Measured

| Tests | L* | a* | b* | C* | h° |
|---|---|---|---|---|---|
| CLEARAM® CH2020 | 87.7964528 | 1.00896 | 12.2456754 | 12.2871712 | 85.2898356 |
| Heat-modified starch "C" | 84.55599502 | 1.794721 | 13.23876699 | 13.395986429 | 82.27973113 |
| NOVATION® 2300 | 86.70282834 | 1.219061 | 12.226452297 | 12.32495981 | 84.32359511 |

Measurement Differences Relative to CLEARAM® CH2020

| Tests | ΔL* | Δa* | Δb* | ΔC* | Δh° | ΔE00 (1:1:1) |
|---|---|---|---|---|---|---|
| Heat-modified starch "C" | −3.240458 | 0.785756 | 0.993092 | 1.072693 | −0.673032 | 2.394904478 |
| NOVATION® 2300 | −1.093625 | 0.210096 | 0.018848 | 0.037789 | −0.207528 | 0.755043034 |

Comments:

Comparison with the test with CLEARAM® CH2020, as standard:

ΔL*: The two tests with the thermally inhibited starch and the heat-modified starch "C" according to the invention are darker than CLEARAM® CH2020.

ΔC*: NOVATION® 2300 shows a chroma very close to that of CLEARAM® CH2020, whereas the heat-modified starch "C" according to the invention shows a greater quantity of color.

Δh*: the thermally inhibited starch and the heat-modified starch "C" according to the invention show a different hue, but the heat-modified starch "C" according to the invention is more pronounced.

ΔE: NOVATION® 2300 shows a ΔE of less than 1.5, which theoretically indicates an imperceptible color difference with regard to CLEARAM® CH2020.

The heat-modified starch "C" according to the invention shows a ΔE of greater than 1.5, which means that the color of the sample is considered to be significantly different from that of CLEARAM® CH2020.

Level of Cooking of the Starch—Light Microscope

There is no more granular starch in the recipe, irrespective of the starch used, probably on account of the cooking process and the high level of shear.

Rheology

| | Flow 15° C. Viscosity (Pa · s) | | | | |
|---|---|---|---|---|---|
| Tests | 5 s⁻¹ | 10 s⁻¹ | 40 s⁻¹ | 100 s⁻¹ | 350 s⁻¹ |
| CLEARAM® CH2020 | 11.17 | 6.72 | 2.61 | 1.44 | 0.70 |
| Heat-modified starch "C" | 8.45 | 5.08 | 1.98 | 1.08 | 0.52 |
| NOVATION® 2300 | 14.32 | 8.69 | 3.06 | 1.70 | 0.86 |

Flow Measurement

All the samples have shear-thinning behavior (the viscosity decreases as the shear rate increases).

At 40 $s^{-1}$, representing the mouthfeel, the viscosity is similar between CLEARAM® CH2020 and NOVATION® 2300. The heat-modified starch "C" is very slightly inferior.

The loss of viscosity relative to the shear rate is equivalent for the three samples. The rheological analysis confirms the sensory results, with a minor difference between the texture of the samples in the mouth.

Yield Point

According to the Herschel Bulkley model and with the measurement conditions, the samples showed no stress. The samples are also easy to pour.

Oscillation Measurement

For each analytical test, G' is dominant relative to G", which is proof that the products have "solid-type behavior".

The firmness (i.e. the level G') is similar for CLEARAM® CH2020 and the heat-modified starch C.

NOVATION® 2300 is slightly less elastic than the other samples that are more resistant.

This analysis also confirms the sensory results.

Conclusion

All the starches show the same weakness when subjected to high stress for the mayonnaise treated at elevated temperature.

All the granules are damaged.

Despite the fluid texture of the product after treatment, all the starches retrograde during the maturation and give the final sauce an acceptable texture.

A slightly thicker texture is noted for the control tests with CLEARAM® CH2020, but not very significant.

A significant dark color is noted for the mayonnaise with the heat-modified starch "C".

Example 11

Use of a Heat-Modified Starch "C" in Fruit Preparations for Yogurts

Fruit preparations for yogurts often contain starch to enable their viscosity to be optimized and to make them stable throughout the shelf life of the product. They are mixed with the white mass of yogurt in proportions that may vary between 10% and 20% in general.

The various starches tested are as follows:
Heat-modified starch "C" according to the invention (prepared according to example 3);

NOVATION® 2300 and NOVATION® Prima 600 sold by the company Ingredion

CLEARAM® CR 08 20, chemically modified starch (hydroxypropyl phosphate) sold by the Applicant Company Recipe:

The starch was tested in a strawberry fruit preparation.

| % Composition | Recipe % |
|---|---|
| Strawberry purée | 45.0 |
| Water | 31.0 |
| Sucrose | 20.0 |
| Test starch | 4.0 |
| | 100.0 |

Preparation Process:
Mix the water and the strawberry purée in a household food mixer.
Mix for 2 minutes at 800 rpm
Add the sugar and the starch
Mix for 2 minutes at 800 rpm
Heat to 90/95° C. in the food mixer
Maintain for 10 minutes at 90/95° C., with mixing at 1800 rpm
Package, cool and store at 4° C.

Tests:

| 1 | Heat-modified starch "C" |
|---|---|
| 2 | NOVATION 2300 |
| 3 | NOVATION Prima 600 |
| 4 | CLEARAM ® CR 08 20 |

NOVATION® Prima 600: only a few visible grains remain. It thus appears that the vast majority of the granules were destroyed during cooking.

CLEARAM® CR 08 20: in this case also, few intact granules remain.

The heat-modified starch according to the invention is thus one of the products tested which best conserves its granular structure, which means that it is capable of withstanding the heat treatment conditions and the acidity conditions of the medium.

Texture Measurements

Bostwick flow (20° C., 90 g of product) after 12 days

| | Tests | | | |
|---|---|---|---|---|
| Time | 1 | 2 | 3 | 4 |
| 30 sec | 5.5 | 6.5 | 6.5 | 9.0 |
| 60 sec | 6.5 | 7.0 | 7.5 | 10.0 |

It is found that the flow behavior is relatively similar between the starches, except for the test with the CLEARAM® CR0820 modified starch, which flows more.

Viscosity

| Rheometer: | Temperature measurement: 20° C. Anton Paar Physica MCR 301 |
|---|---|
| Geometry: | CC27 |
| Method | 0 to 350 s$^{-1}$ in 180 s and 350 s$^{-1}$ to 0 s$^{-1}$ in 180 s |

The viscosity is measured after 1 day, 15 days and 30 days.

The values are given with an uncertainty of ±5%.

| | D +1 | | | | | D +15 | | | | | D +30 | | | | |
|---|---|---|---|---|---|---|---|---|---|---|---|---|---|---|---|
| Shear values in s$^{-1}$ | 5 | 10 | 40 | 100 | 350 | 5 | 10 | 40 | 100 | 350 | 5 | 10 | 40 | 100 | 350 |
| Heat-modified starch "C" | 6.78 | 4.1 | 1.72 | 0.97 | 0.45 | 7.85 | 4.6 | 1.75 | 0.9 | 0.39 | 8.8 | 5.11 | 1.89 | 0.93 | 0.38 |
| NOVATION ® 2300 | 5.93 | 3.7 | 1.61 | 0.92 | 0.43 | 7.34 | 4.47 | 1.84 | 1 | 0.44 | 8.31 | 4.89 | 1.87 | 0.99 | 0.43 |
| CLEARAM CR0820 | 11 | 6.6 | 3 | 1.71 | 0.7 | 9.82 | 6.29 | 2.78 | 1.58 | 0.72 | 9.97 | 6.35 | 2.78 | 1.57 | 0.71 |
| NOVATION Prima 600 | 4.9 | 3 | 1.3 | 0.78 | 0.38 | 4.49 | 2.84 | 1.22 | 0.7 | 0.34 | 5.17 | 3.21 | 1.31 | 0.73 | 0.35 | pH of the Tests:

| Tests | 1 | 2 | 3 | 4 |
|---|---|---|---|---|
| pH | 3.55 | 3.45 | 3.45 | 3.50 |

All the tests have a very acidic pH, which may have an incidence on the degradation of the starch during the cooking process.

State of Cooking of the Starch:

The state of cooking of the starch is monitored with a light microscope on the fruit preparation after cooking.

The preparation is colored with Lugol to improve the visualization of the starches.

Heat-Modified Starch "C":

Well-cooked (swollen) granules and also fragments of granules are observed. A portion of the granules was thus destroyed by the manufacturing process.

NOVATION® 2300: a certain number of intact, well-cooked granules are also found, but they appear to be less numerous. Moreover, many fragments are observed.

In the graph of FIG. 9, it is seen that the viscosity of the fruit preparation containing CLEARAM CR0820 is higher. It has a tendency to be stable, or even to decrease slightly.

The heat-modified starch "C" gives a viscosity close to that obtained with NOVATION® 2300, and which increases slightly over time.

Finally, NOVATION® Prima 600 is the product whose viscosity is the lowest. It is stable on storage.

Sensory Analysis

The four products were evaluated by a trained panel of 13 people. The method used is the flash profile method: the panel members themselves select the criteria which appear to be the most discriminating between the samples, and they then classify them according to the selected criteria.

The conclusion of the sensory analysis is as follows:

Relative to the modified starch CLEARAM CR0820, the heat-modified starch "C" gives a fruit preparation which is less thick (in the mouth and by spoon), less tacky and more fondant. It also appears less sweet.

Relative to the starches NOVATION® Prima 600 and NOVATION® 2300:

NOVATION® 2300 leads to a fruit preparation which is thick in the mouth and coating, but also tacky and with an after-taste.

NOVATION® Prima 600 affords little texture (mouth and spoon), but it gives good gloss and maintains the sweet taste.

The starch according to the invention has a fondant nature, is sparingly tacky and sparingly sweet.

The sensory analysis thus confirms the results of the rheological measurements, with a thicker texture for the modified starch.

In conclusion, over all of these results, it is seen that the performance of the heat-modified starch according to the invention approaches that of NOVATION® 2300.

The resistance to shear under acidic conditions is higher than that of CLEARAM® CR0820, which is a starch commonly used in fruit preparations. The viscosity obtained is, on the other hand, slightly lower.

Example 12

Preparation of Heat-Modified Starch from Potato Starch

1) The basification of potato starch is performed according to the following steps:

Prepare a potato starch suspension with a solids content (SC) of 36.5%

Add powdered sodium carbonate to obtain a final conductivity on the powder resuspended to an SC of 20% of between 0.7 and 1.1 mS/cm Ensure a contact time of 1 hour Filter and dry to an equilibrium moisture of the starch of between 12-18%

2) Heat treatment

The product thus obtained is heat-treated in VOMM continuous turboreactors in series, the nominal temperature of which is set at 210° C. and which are configured to subject the product to a residence time of the order of 30-35 minutes, and such that the difference in temperature between the nominal temperature and the temperature of the product leaving the reactor, known as Delta T, is a value of the order of 19-22° C.

Process Parameters

| Exp. | Conductivity on product after impregnation, resuspended at 20% SC, in mS/cm | Moisture of the product before heat treatment, in % | Delta T | Nominal T ° C. | Residence time (minutes) |
|---|---|---|---|---|---|
| Potato starch base | 0.11 | 15.7 | 0 | 0 | 0 |
| E-1 | 0.96 | 12 | 21 | 210 | 33 |
| E-2 | 0.96 | 12 | 21 | 210 | 42 |
| E-3 | 0.96 | 12 | 22.5 | 210 | 48 |

The RVA viscosity measurements are performed and are presented in the table below.

Results:

| Tests | RVA peak (mPa · s) | RVA drop (mPa · s) |
|---|---|---|
| Potato starch base | 877 | 554 |
| E-1 | 563 | −308 |
| E-2 | 379 | −404 |
| E-3 | 178 | −415 |

Comparative Study

An analysis is performed comparing the products according to the invention with commercial products of the same category. The products derived from the invention are treated according to the following protocol:

Resuspension of the starch at 36.5% SC

Neutralization with 20% hydrochloric acid to pH 5.5±1

Filtration, washing to obtain a conductivity of less than 500 μS, drying to the conventional moisture content of the starch of between 14% and 18%

| Tests | % Moisture content | pH at 20% SC | Conductivity at 20% SC (μS) | RVA peak (mPa · s) | RVA drop (mPa · s) |
|---|---|---|---|---|---|
| E-1 | 15 | 6.2 | 67.5 | 495 | −330 |
| E-2 | 14.5 | 6.2 | 68.1 | 326 | −450 |
| E-3 | 15.5 | 6.2 | 68.5 | 242 | −412 |
| Beco Gel P4500 | 11.6 | 7.1 | 107 | 269 | −169 |
| NOVATION 1900 | 15.8 | 5.3 | 174 | 869 | 216 |
| D | 11 | 6.28 | 55 | 251 | −159 |

Each example E-1, E-2 and E-3 of potato starches heat-modified according to the invention has improved stability during the process of use relative to the native starch: less gain in viscosity and less retrogradation are observed during the use of these starches. This is seen by measuring the drop with an RVA viscometer: the more negative the drop, the more resistant the starch will be to shear, to the acidity of the media and to the heat treatments.

Each example E-1, E-2 and E-3 of potato starches heat-modified according to the invention may be compared with other thermally inhibited products of the prior art based on potato starch, such as NOVATION 1900 or Beco Gel P4500. From the RVA viscometer results, the products that are the most resistant are the products derived from the invention.

Similarly, each example E-1, E-2 and E-3 of potato starches heat-modified according to the invention may be compared with the examples on waxy corn and notably the family D: the examples E-1, E-2 and E-3 of potato starches have a higher peak viscosity for the same measured solids content and have higher resistance to the process. The choice of the use of these starches will thus be made as a function of the intended application and thus of the shear, acidity and temperature conditions used.

Example 13

Preparation of Heat-Modified Cassava Starch

1) The Basification of Cassava Starch is Performed According to the Following Steps:

Prepare a cassava starch suspension with a solids content (SC) of 36.5%

Add powdered sodium carbonate to obtain a final conductivity on the powder resuspended to an SC of 20% of between 0.7 and 1.1 mS/cm Ensure a contact time of 1 hour Filter and dry to an equilibrium moisture of the starch of between 10-15%

2) Heat treatment

The product thus obtained is heat-treated in VOMM continuous turboreactors in series, the nominal temperature of which is set at 210° C. and which are configured to subject the product to a residence time of the order of 20 to 35 minutes, and such that the difference in temperature between the nominal temperature and the temperature of the product leaving the reactor, known as Delta T, is a value of the order of 22-27° C.

Process Parameters

| Tests | Conductivity on product after impregnation, resuspended at 20% SC, in mS/cm | Moisture of the product before heat treatment, in % | Delta T | Nominal T ° C. | Residence time (minutes) |
|---|---|---|---|---|---|
| Cassava starch base | 0.10 | 12.5 | 0 | 0 | 0 |
| F-1 | 0.95 | 10 | 27 | 210 | 20 |
| F-2 | 0.95 | 10 | 24 | 210 | 30 |
| F-3 | 0.95 | 10 | 25 | 210 | 35 |

The RVA viscosity measurements are performed and are presented in the table below.

Results:

| Tests | RVA peak (mPa · s) | RVA drop (mPa · s) |
|---|---|---|
| Cassava starch base | 603 | 480 |
| F-1 | 379 | 29 |
| F-2 | 206 | −118 |
| F-3 | 110 | −178 |

Comparative Study

An analysis is performed comparing the products according to the invention with commercial products of the same category. The products derived from the invention are treated according to the following protocol:

Resuspension of the starch at 36.5% SC

Neutralization with 20% hydrochloric acid to pH 5.5±1

Filtration, washing to obtain a conductivity of less than 500 μS, drying to the conventional moisture content of the starch of between 10% and 15%

| Tests | % Moisture content | pH at 20% SC | Conductivity at 20% SC (μS) | RVA peak (mPa · s) | RVA drop (mPa · s) |
|---|---|---|---|---|---|
| F-1 | 11 | 5.6 | 84 | 344 | −10 |
| F-2 | 10 | 5.9 | 70 | 186 | −121 |
| F-3 | 10 | 5.8 | 75 | 99 | −140 |
| CLARIA ® Bliss 570 | 12.7 | 6.1 | 190 | 518 | 36 |
| D | 11 | 6.28 | 55 | 251 | −159 |

Each example F-1, F-2 and F-3 of cassava starches heat-modified according to the invention has improved stability during the process of use relative to the native starch: less gain in viscosity and less retrogradation are observed during the use of these starches. This is seen by measuring the drop with an RVA viscometer: the more negative the drop, the more resistant the starch will be to shear, to the acidity of the media and to the heat treatments.

Each example F-1, F-2 and F-3 of cassava starches heat-modified according to the invention may be compared with other thermally inhibited products of the prior art based on cassava starch, such as CLARIA Bliss 570. From the RVA viscometer results, the products that are the most resistant are the products derived from the invention.

Similarly, each example F-1, F-2 and F-3 of cassava starches heat-modified according to the invention may be compared with the examples on waxy corn and notably the family D: the family D has a higher peak viscosity for the same measured solids content and has higher resistance to the process. The choice of the use of these starches will thus be made as a function of the intended application and thus of the shear, acidity and temperature conditions used.

Example 14

Preparation of Heat-Modified Pea Starches

1) The basification of pea starch is performed according to the following steps:

Prepare a pea starch suspension with a solids content (SC) of 33%

Add powdered sodium carbonate to obtain a final conductivity on the powder resuspended to an SC of 20% of between 0.7 and 1.1 mS/cm Ensure a contact time of 1 hour Filter and dry to an equilibrium moisture of the starch of between 10-15%

2) Heat treatment

The product thus obtained is heat-treated in VOMM continuous turboreactors in series, the nominal temperature of which is set at 210° C. and which are configured to subject the product to a residence time of the order of 10-25 minutes, and such that the difference in temperature between the nominal temperature and the temperature of the product leaving the reactor, known as Delta T, is a value of the order of 21-25° C.

Process Parameters

| Tests | Conductivity on product after impregnation, resuspended at 20% SC, in mS/cm | Moisture of the product before heat treatment, in % | Delta T | Nominal T ° C. | Residence time (minutes) |
|---|---|---|---|---|---|
| Pea starch base | 0.09 | 12.9 | 0 | 0 | 0 |
| G-1 | 0.9 | 10 | 24 | 210 | 12 |
| G-2 | 0.9 | 10 | 23.5 | 210 | 21 |

The RVA viscosity measurements are performed and are presented in the table below.

Results:

| Tests | RVA peak (mPa · s) | RVA drop (mPa · s) |
|---|---|---|
| Pea starch base | 285 | 76 |
| G-1 | 154 | −154 |
| G-2 | 46 | −104 |

Comparative Study:

An analysis is performed comparing the products according to the invention with commercial products of the same category. The products derived from the invention are treated according to the following protocol:

Resuspension of the starch at 36.5% SC
Neutralization with 20% hydrochloric acid to pH 5.5±1
Filtration, washing to obtain a conductivity of less than 500 µS, drying to the conventional moisture content of the starch of between 14% and 18%

| Tests | % Moisture content | pH at 20% SC | Conductivity at 20% SC (µS) | RVA peak (mPa·s) | RVA drop (mPa·s) |
|---|---|---|---|---|---|
| G-1 | 10 | 6 | 20 | 170 | −154 |
| G-2 | 11.5 | 5.9 | 36 | 63 | −131 |
| D | 11 | 6.28 | 55 | 251 | −159 |

Each example G-1 and G-2 of pea starches heat-modified according to the invention has improved stability during the process of use relative to the native starch: less gain in viscosity and less retrogradation are observed during the use of these starches. This is seen by measuring the drop with an RVA viscometer: the more negative the drop, the more resistant the starch will be to shear, to the acidity of the media and to the heat treatments.

Each example G-1 and G-2 of pea starch heat-modified according to the invention may be compared with the examples on waxy corn and notably the family D: each example G-1 and G-2 has a lower peak viscosity for the same measured solids content and has a resistance to the process equivalent to that of the family D. The particular feature of the pea starch is the production of a very resistant product by means of a shorter residence time than for the other starting materials. The choice of the use of these starches will thus be made as a function of the intended application and thus of the shear, acidity and temperature conditions used.

Example 15

Use of Heat-Modified Starches "C" in Tomato Sauce—Ketchup

The analysis is performed on the basis of the following control recipe:

| Ingredients | Amount (%) |
|---|---|
| Water | 45 |
| 28% tomato concentrate | 26.0 |
| Test starch | 3.2 |
| Salt | 2.0 |
| 8° vinegar | 8.8 |
| Sucrose | 15.0 |
| Total | 100 |

The process for preparing the ketchup tomato sauce is as follows:
For a 2 kg batch:
4. Cooking step on a 2 L Hotmix Pro Combi cooker:
   e. Mix all the ingredients together in the bowl of the Hotmix machine
   f. Cooking 100° C., 30 minutes. The first 10 minutes at speed 3 (800 rpm) then the last 20 minutes at speed 1 E (480 rpm) using the mixing spindle (butterfly), since the mixture becomes too viscous.
5. Packaging/conditioning
   Filling of 330 g in 375 ml glass bottles at a temperature of 60-65° C.
6. Pasteurization
   Autoclave at 85° C. for 45 minutes (equipment: Steriflow rotary bi-process ⌀900 mm—1 basket—Ref.: NS 911 R MP FLW STEAM, year 2017, www.steriflow.com/en; Rotation: no (static)—heat treatment by pasteurization with water cascade)

At the end, the recipe is characterized by:
Total water content: 43%
pH: 3.7
Brix: 29.5

The various starches tested are as follows:
Heat-modified starch "C-3" according to the invention (example 3)
CLEARAM® CH2020 sold by the Applicant Company (acetylated adipate crosslinked waxy corn starch)
NOVATION® 2300 sold by the company Ingredion Evaluation of the various tomato sauces is performed by means of the following measurements:

5. Level of Cooking of the Starch

The level of cooking is determined by light microscopy (Leica microscope—×20 lens and×150 amplification). The sample is dispersed in demineralized water and then colored with Lugol for the purpose of revealing the starch granules. The iodine reacts with the amylose and forms spiral-structured complexes. A blue/violet color results if the starch is rich in amylose. Otherwise, the color of the starch granules remains brown/yellow.

The light microscopy observations give various information:
check the presence and appearance of the starch granules. They may be present as "uncooked"; "slightly cooked"; "moderately cooked"; "well cooked"; "fragmented"; or "solubilized (absent)".

6. Rheology

Several methods were used for the evaluation of the rheological properties of the sauces obtained.

a. Flow Measurement

Equipment: Anton Paar, MCR301 rheometer
Characterization of the behavior of non-Newtonian fluids. The instrument imposes a specific stress field or a strain on the fluid, and monitors the resulting strain or stress. The results are expressed in a logarithmic-scale curve of viscosity (Pa·s) as a function of the shear rate ($\gamma$). The result highlighted in this study is the viscosity at $\gamma$=40 s−1 (equivalent shear of the texture measured in the mouth).

Geometry: concentric cylinders
Analysis: Oscillation
   Temperature: 20° C. (+1 minute of temperature stabilization)
   Time: 10 minutes
   Oscillation stress: 0.1 to 1000 Pa
Repeatability: average of three measurements
Accuracy: 5% b. Bostwick Consistometer

The Bostwick machine is a consistometer. It consists of a rectangular stainless-steel tank separated into two parts by a guillotine door. The smaller section serves as a reservoir for the material to be evaluated. The larger section is equipped with ½ cm graduation marks starting from the door and going to the opposite end. The door is actuated by a spring. It is held in the bottom position by means of a lever arm. This mechanism ensures instant release of the product. The door slides vertically in grooves located in the side walls of the rectangular tank. The L-shaped tripping device holds the door in the bottom position. Two leveling screws are located close to the reservoir for the material to be tested and a spirit level is located at the other end of the machine.

For this evaluation, the tank was filled to its full capacity. The flow was measured over 30 s and 40 s. A mean was then determined (i.e. at 35 s) to have a value of two repetitions per sauce (at 20° C.).

Results and Discussion:

5. Level of Cooking of the Starch

The microscope allows a qualitative analysis of the level of cooking of the starch grains.

The microscopic observations of the ketchup made with NOVATION® 2300 show starch grains that are well cooked and a few less cooked grains.

The microscopic observation of the ketchup with CLEARAM® CH2020 shows starch grains that are well cooked, and also a certain amount of debris.

The microscopic observation of the heat-modified starch "C-3" according to the invention shows starch grains that are well cooked. The behavior of the granules is close to that of NOVATION® 2300. Little debris is observed for these two starches. They appear to be more resistant than CLEARAM® CH2020 under these conditions.

6. Rheological Properties a. Flow Measurement

The table below summarizes the flow measurement results:

| Parameters | CLEARAM® CH2020 | Heat-modified starch "C-3" | NOVATION® 2300 |
|---|---|---|---|
| Viscosity (Pa · s) at a shear of 40 s−1 | 1.9 | 1.3 | 1.7 |

The viscosity developed by the heat-modified starch "C3" is slightly lower than that of CLEARAM® CH2020 and of NOVATION® 2300.

b. Consistency (Bostwick)

The table below summarizes the consistency measurement results:

| Parameters | CLEARAM® CH2020 | Heat-modified starch "C3" | NOVATION® 2300 |
|---|---|---|---|
| Flow (cm) over 35 s | 5.0 | 7.0 | 4.8 |

The ketchup made with the heat-modified starch "C3" has higher flow than the other two. This confirms the preceding flow data.

The ketchup made with the heat-modified starch "C3" is more fluid than the ketchup made with CLEARAM® CH2020 and NOVATION® 2300.

CONCLUSION

The heat-modified starch "C3" according to the invention has, in the ketchup sauce application, behavior close to that of the controls: CLEARAM® CH2020 (acetylated adipate crosslinked waxy corn starch), and the thermally inhibited starch NOVATION® 2300 but, however, develops less viscosity under the same conditions despite an equivalent level of swelling (cf. microscopic analysis).

The invention claimed is:

1. A process for producing a heat-modified starch resistant to shear, to acidity and to heat treatments, being said process without use of an aqueous-alcoholic solvent and comprising the steps of:
   (i) preparing a starch milk with a solids content of between 30% and 40% by weight,
   (ii) Adding a powdered alkaline agent to the starch milk to reach a pH between 10.2 and 10.8,
   (iii) ensuring a contact time of starch milk and alkaline agent of between 0.5 and 5 hours,
   (iv) filtering and drying the starch milk subsequently to step (iii) to an equilibrium moisture of the starch of between 10-14% by weight, and
   (v) heating said dried starch so as to bring it to a temperature above 180° C. for a residence time of between 8 and 50 minutes;
   wherein the powdered alkaline agent is added in step (ii) so as to obtain a final conductivity of between 0.7 and 2.5 mS/cm, the final conductivity being measured after drying the starch milk in step (iv) and resuspending the starch to a solids content of 20% by weight.

2. The process as claimed in claim 1, characterized in that the starch originated from waxy corn.

3. The process as claimed in claim 1, characterized in that the starch originated from potato, cassava or pea.

4. The process as claimed in claim 1, characterized in that the alkaline agent is chosen from the group consisting of sodium hydroxide, sodium carbonate, tetrasodium pyrophosphate, ammonium orthophosphate, disodium orthophosphate, trisodium phosphate, calcium carbonate, calcium hydroxide, potassium carbonate and potassium hydroxide, taken alone or in combination.

5. The process as claimed in claim 4, characterized in that the heating of the dry starch obtained in step (iv) is performed in devices of continuous turboreactor type, for which the nominal temperature is set above 190° C., and the delta T, defined as the difference in temperature between the nominal temperature and the temperature of the product leaving the reactor, is between 15 and 25° C.

6. The process as claimed in claim 2, characterized in that:
   the final conductivity of the product being measured after drying the starch milk in step (iv) and resuspending the starch to a solids content of 20% by weight is between 1.75 and 2 mS/cm, and in that the heating conditions of step (v) are as follows:
   nominal temperature of the order of 200° C.,
   residence time of 20 minutes, and
   delta T of a value of 16 to 17° C.

7. The process as claimed in claim 2, characterized in that:
   the final conductivity of the product being measured after drying the starch milk in step (iv) and resuspending the starch to a solids content of 20% by weight is between 1.2 and 1.32 mS/cm,
   and in that the heating conditions of step (v) are as follows:
   nominal temperature of the order of 210° C.,
   residence time of between 15 and 20 minutes, and
   delta T of a value of 21 to 23° C.

8. The process as claimed in claim 2, characterized in that:
   the final conductivity of the product being measured after drying the starch milk in step (iv) and resuspending the starch to a solids content of 20% by weight is between 1.4 and 1.6 mS/cm,
   and in that the heating conditions of step (v) are as follows:
   nominal temperature of the order of 210° C.,
   residence time of between 25 and 30 minutes, and
   delta T of a value of 22° C.

9. The process as claimed in claim 3, characterized in that:
the final conductivity of the product being measured after drying the starch milk in step (iv) and resuspending the starch to a solids content of 20% by weight is of the order of 1.4 mS/cm, and in that the heating conditions of step (v) are as follows:
nominal temperature of the order of 210° C.,
residence time of 35 minutes, and
delta T of a value of 22° C.

10. The process for producing a heat-modified starch of claim 1 comprising the step (i) of preparing a starch milk with a solids content of between 35% and 37% by weight.

11. The process for producing a heat-modified starch of claim 1 comprising the step (v) of heating said dried starch so as to bring it to a temperature above 180° C. for a residence time of between 10 and 40 minutes.

12. The process for producing a heat-modified starch of claim 1 comprising the step (v) of heating said dried starch so as to bring it to a temperature above 180° C. for a residence time of between 12 and 35 minutes.

13. The process as claimed in claim 1, characterized in that the alkaline agent is sodium carbonate.

14. The process for producing a heat-modified starch of claim 4 characterized in that the heating of the dry starch obtained in step (iv) is performed in devices of continuous turboreactor type, for which the nominal temperature is set between 195 and 240° C., and the delta T, defined as the difference in temperature between the nominal temperature and the temperature of the product leaving the reactor, is between 15 and 25° C.

* * * * *